(12) United States Patent
Shahoian et al.

(10) Patent No.: US 6,717,573 B1
(45) Date of Patent: Apr. 6, 2004

(54) LOW-COST HAPTIC MOUSE IMPLEMENTATIONS

(75) Inventors: Erik J. Shahoian, San Ramon, CA (US); Louis B. Rosenberg, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 369 days.

(21) Appl. No.: 09/759,780

(22) Filed: Jan. 12, 2001

Related U.S. Application Data

(63) Continuation-in-part of application No. 09/563,783, filed on May 2, 2000, and a continuation-in-part of application No. 09/456,887, filed on Dec. 7, 1999, now Pat. No. 6,211,861, and a continuation-in-part of application No. 09/253,132, filed on Feb. 18, 1999, now Pat. No. 6,243,078, which is a continuation of application No. 09/103,281, filed on Jun. 23, 1998, now Pat. No. 6,088,019.

(60) Provisional application No. 60/176,108, filed on Jan. 14, 2000.

(51) Int. Cl.$^7$ .................................................. G09G 5/08
(52) U.S. Cl. .................... 345/161; 345/156; 345/701; 345/702
(58) Field of Search ............................ 345/156, 157, 345/161, 163, 700, 701, 702

(56) References Cited

U.S. PATENT DOCUMENTS

| | | | |
|---|---|---|---|
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,623,064 A | 11/1971 | Kagan | |
| 3,902,687 A | 9/1975 | Hightower | |
| 3,903,614 A | 9/1975 | Diamond et al. | |
| 3,911,416 A | 10/1975 | Feder | |
| 4,160,508 A | 7/1979 | Salisbury, Jr. | |
| 4,236,325 A | 12/1980 | Hall et al. | |
| 4,513,235 A | 4/1985 | Acklam et al. | |
| 4,581,491 A | 4/1986 | Boothroyd | |
| 4,599,070 A | 7/1986 | Hladky et al. | |
| 4,708,656 A | 11/1987 | de Vries et al. | |
| 4,713,007 A | 12/1987 | Alban | |
| 4,794,392 A | 12/1988 | Selinko | |

(List continued on next page.)

FOREIGN PATENT DOCUMENTS

EP      0 349 086 A1      1/1990

OTHER PUBLICATIONS

Baigrie, "Electric Control Loading—A Low Cost, High Performance Alternative," *Proceedings of Interservice/Industry Training Systems Conference*, pp. 247–254, Nov. 6–8, 1990.

Iwata, "Pen–based Haptic Virtual Environment," 0–7803–1363–1/93 IEEE, pp. 287–292, 1993.

Russo, "The Design and Implementation of a Three Degree of Freedom Force Output Joystick," *MIT Libraries Archives* pp. 1–131, May 1990, archived Aug. 14, 1990.

(List continued on next page.)

*Primary Examiner*—Richard Hjerpe
*Assistant Examiner*—Ronald Laneau

(57) ABSTRACT

Low-cost haptic interface device implementations for interfacing a user with a host computer. A haptic feedback device, such as a mouse or other device, includes a housing physically contacted by a user, and an actuator for providing motion that causes haptic sensations on the device housing and/or on a movable portion of the housing. The device may include a sensor for detecting x-y planar motion of the housing. Embodiments include actuators with eccentric rotating masses, buttons having motion influenced by various actuator forces, and housing portions moved by actuators to generate haptic sensations to a user contacting the driven surfaces.

45 Claims, 8 Drawing Sheets

U.S. PATENT DOCUMENTS

| | | | |
|---|---|---|---|
| 4,891,764 | A | 1/1990 | McIntosh |
| 4,930,770 | A | 6/1990 | Baker |
| 4,934,694 | A | 6/1990 | McIntosh |
| 5,019,761 | A | 5/1991 | Kraft |
| 5,022,407 | A | 6/1991 | Horch et al. |
| 5,035,242 | A | 7/1991 | Franklin et al. |
| 5,038,089 | A | 8/1991 | Szakaly |
| 5,078,152 | A | 1/1992 | Bond et al. |
| 5,212,473 | A | 5/1993 | Louis |
| 5,240,417 | A | 8/1993 | Smithson et al. |
| 5,271,290 | A | 12/1993 | Fischer |
| 5,275,174 | A | 1/1994 | Cook |
| 5,299,810 | A | 4/1994 | Pierce et al. |
| 5,309,140 | A | 5/1994 | Everett, Jr. et al. |
| 5,334,027 | A | 8/1994 | Wherlock |
| 5,466,213 | A | 11/1995 | Hogan et al. |
| 5,547,382 | A | 8/1996 | Yamasaki et al. |
| 5,766,016 | A | 6/1998 | Sinclair et al. |
| 5,785,630 | A | 7/1998 | Bobick et al. |
| 6,219,034 | B1 | 4/2001 | Elbing et al. |
| 6,411,276 | B1 * | 6/2002 | Braun et al. ................. 345/156 |
| 6,448,977 | B1 * | 9/2002 | Braun et al. ................. 345/701 |
| 6,469,692 | B2 | 10/2002 | Rosenberg |
| 2002/0021277 | A1 * | 2/2002 | Kramer et al. .............. 345/156 |
| 2002/0054011 | A1 * | 5/2002 | Bruneau et al. ............ 345/156 |

OTHER PUBLICATIONS

Brooks et al., "Hand Controllers for Teleoperation—A State–of–the–Art Technology Survey and Evaluation," *JPL Publication 85–11*, NASA–CR–175890; N85–28559, pp. 1–84, Mar. 1, 1985.

Jones et al., "A perceptual analysis of stiffness," ISSN 0014–4819 Springer International (Springer–Verlag); *Experimental Brain Research*, vol. 79, No. 1, pp. 150–156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25–44, May 2, 1993.

Snow et al., Model–X Force–Reflecting–Hand–Controller, NT Control No. NPO–17851; JPL Case No. 7348, pp. 1–4 with 45 pages of attachments, Jun. 15, 1989.

Ouh–Young, "Force Display in Molecular Docking," Doctoral Dissertation, University of North Carolina at Chapel Hill, UMI Order No. 9034744, p. 1–369, 1990.

Tadros, "Control System Design for a Three Degree of Freedom Virtual Environment Simulator Using Motor/Brake Pair Actuators," *MIT Archive*, pp. 1–88, Feb. 1990, archived Aug. 13, 1990.

Caldwell et al., "Enhanced Tactile Feedback (Tele–Taction) Using a Multi–Functional Sensory System,"0 1050–4729/93, pp. 955–960, 1993.

Adelstein et al., "Design and Implementation of a Force Reflecting Manipulandum for Manual Control research," DSC–vol. 42, *Advances in Robotics*, pp. 1–12, 1992.

Gotow et al., "Controlled Impedance Test Apparatus for Studying Human Interpretation of Kinesthetic Feedback," WA11–11:00, pp. 332–337.

Stanley et al., "Computer Simulation of Interacting Dynamic Mechanical Systems Using Distributed Memory Parallel Processors," DSC–vol. 42, *Advances in Robotics*, pp. 55–61, ASME 1992.

Russo, "Controlling Dissipative Magnetic Particle Brakes in Force Relfective Devices," DSC–vol. 42, *Advances in Robotics*, pp. 63–70, ASME 1992.

Kontarinis et al., "Display of High–Frequency Tactile Information to Teleoperators," *Telemanipulator Technology and Space Telerobotics*, Won S. Kim, Editor, Proc. SPIE vol. 2057, pp. 40–50, Sep. 7–9, 1993.

Patrick et al., "Design and Testing of A Non–reactive, Fingertip, Tactile Display for Interaction with Remote Environments," *Cooperative Intelligent Robotics in Space*, Rui J. deFigueiredo et al, Editor, Proc. SPIE vol. 1387, pp. 215–222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man–Machine Interface for Advanced Teleoperation,"*Science*, vol. 208, No. 4450, pp. 1327–1335, 1980.

Bejczy et al., "Generalization of Bilateral Force–Reflecting Control of Manipulators," *Proceedings Of Fourth CISM–IFToMM*, Sep. 8–12, 1981.

McAffee et al., "Teleoperator Subsystem/Telerobot Demonstrator: Force Relfecting Hand Controller Equipment Manual," *JPL* 1988, JPL D–5172.

Minsky, "Computational Haptics: The Sandpaper System for Synthesizing Texture for a Force–Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21–23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30–Oct. 1, 1992.

IBM Technical Disclosure Bulletin, "Mouse Ball–Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire*, Mar. 10–11, 1988.

Howe, "A Force–Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf ahd deaf–blind individuals," *IEEE Virtual Reality Annual International Symposium*, Seattle, WA, Sep. 18–22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Enginerrs*, San Francisco, CA, Aug. 12–15, 1980.

Bejczy et al., "A Laboratory Breadboard System For Dual–Arm T eleoperation," *SOAR '89 Workshop, JSC*, Houston, TX, Jul. 25–27, 1989.

Ouhyoung et al., "A Low–Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8–11, 1994.

Bejczy, et al., "Universal Computer Control System (UCCS) For Space Telerobots," CH2413–3/87/0000/0318501.00 1987 IEEE, 1987.

\* cited by examiner

LOW-COST HAPTIC MOUSE IMPLEMENTATIONS

CROSS REFERENCE TO RELATED APPLICATIONS

This application claims the benefit of U.S. Provisional Application No. 60/176,108, filed Jan. 14, 2000, entitled, "Low-Cost Haptic Mouse Implementations," and this application is a continuation-in-part of copending U.S. patent applications Ser. No. 09/253,132, filed Feb. 18, 1999; now U.S. Pat. No. 09/456,887, filed Dec. 7, 1999; now U.S. Pat. No. 6,211,861 and Ser. No. 09/563,783, filed May 2, 2000, which is a continuation of application Ser. No. 09/103,281, filed Jun. 23, 1998 now U.S. Pat. No. 6,088,019, all off which are incorporated by reference herein in their entirety.

BACKGROUND OF THE INVENTION

The present invention relates generally to haptic feedback interface devices for use with a computer, and more particularly to low-cost haptic devices producing tactile sensations.

Using an interface device, a user can interact with an environment displayed by a computer system to perform functions and tasks on the computer, such as playing a game, experiencing a simulation or virtual reality environment, using a computer aided design system, operating a graphical user interface (GUI), or otherwise influencing events or images depicted on the screen. Common human-computer interface devices used for such interaction include a joystick, mouse, trackball, steering wheel, stylus, tablet, pressure-sensitive ball, or the like, that is connected to the computer system controlling the displayed environment.

In some interface devices, force feedback or tactile feedback is also provided to the user, also known more generally herein as "haptic feedback." These types of interface devices can provide physical sensations which are felt by the user using the controller or manipulating the physical object of the interface device. One or more motors or other actuators are used in the device and are connected to the controlling computer system. The computer system controls forces on the haptic feedback device in conjunction and coordinated with displayed events and interactions on the host by sending control signals or commands to the haptic feedback device and the actuators.

Many low cost haptic feedback devices provide forces to the user by vibrating the manipulandum and/or the housing of the device that is held by the user. The output of simple vibration haptic feedback (tactile sensations) requires less complex hardware components and software control over the force-generating elements than does more sophisticated haptic feedback. For example, in many current game controllers for game consoles such as the Sony Playstation and the Nintendo 64, one or more motors are mounted in the housing of the controller and which are energized to provide the vibration forces. An eccentric mass is positioned on the shaft of each motor, and the shaft is rotated unidirectionally to cause the motor and the housing of the controller to vibrate. The host computer (console unit) provides commands to the controller to turn the vibration on or off or to increase or decrease the frequency of the vibration by varying the rate of rotation of the motor.

One problem with these currently-available implementations of haptic feedback devices is that the vibrations or other haptic sensations that these implementations produce are very limited and cannot be significantly varied. In addition, gamepad tactile generation devices may not be as suitable for other types of interface devices, in particular mouse interfaces or other similar position control input devices. The prior art devices also severely limit the haptic feedback effects which can be experienced by a user of these devices.

SUMMARY OF THE INVENTION

The present invention is directed to providing low-cost haptic feedback capability to a mouse interface device and other interface devices that communicate with a host computer or controller. The embodiments disclosed herein allow haptic sensations to be output by devices that do not require significant design changes to existing interface devices.

More specifically, in one aspect of the present invention, a haptic feedback mouse device for providing haptic sensations to a user includes a housing physically contacted by the user and movable in an x-y plane, a sensor coupled to the housing and operative to output a sensor signal indicative of the x-y movement, an actuator, and a mass coupled to the actuator, wherein said eccentric mass can be rotated by the actuator. The rotation of the mass causes inertial haptic sensations to be output on the housing and felt by the user. In one embodiment, the actuator rotates the eccentric mass approximately in an x-z plane, a y-z plane, or a combination thereof. In another embodiment, the actuator rotates the eccentric mass approximately in an x-y plane. The inertial force can be a pulse, vibration, or texture correlated with the interaction of a user-controlled cursor with a graphical object displayed in a graphical user interface of a host computer.

In another aspect of the present invention, a haptic feedback device includes a housing physically contacted by the user, where the housing includes a movable portion and a base portion, wherein the movable portion is movable with respect to the base portion, and where the moveable portion includes a magnet. An actuator is coupled to the housing, and an eccentric mass is coupled to the actuator, where the eccentric mass can be rotated by the actuator. A magnetic interaction between said eccentric mass and said magnet causes an inertial haptic sensation to be output on said movable portion of said housing and felt by said user when said user contacts said movable portion, said inertial haptic sensation influenced by the position of the mass. The movable portion can be a button. The eccentric mass is made of a material that interacts magnetically with the magnet, such as iron or steel or a permanently-magnetic material.

In another aspect of the present invention, a haptic feedback device provides haptic sensations to a user and includes a housing physically contacted by the user, where the housing includes a movable portion and a base portion, where the movable portion is movable with respect to the base portion. An actuator is coupled to the housing or to the movable portion, and a mass coupled to the actuator, where the mass can be rotated by the actuator. A stop member is coupled to the movable portion or the housing and is positioned at least partially in a path of rotation of the mass, where the mass is moved against the stop to produce haptic sensations on the movable portion felt by the user contacting the movable portion. The movable portion can be a button of the device. Additional stop members can be provided in the range of motion of the mass, and inertial and kinesthetic feedback modes can be provided.

In another aspect of the present invention, a haptic feedback mouse device provides haptic sensations to a user and includes a device housing physically contacted by the user and movable in an x-y plane, where the device housing includes a movable portion and a main housing portion, where the movable portion is movable with respect to the main housing portion. A moving magnet actuator has an actuator housing coupled to the device housing and a moving magnet coupled to the movable portion, and a sensor outputs a sensor signal indicative of housing movement in an x-y plane. In one embodiment, the user can select one of a hierarchy of graphical objects by moving the movable portion, wherein a haptic sensation indicates to the user a selection of each of the graphical objects in the hierarchy.

In yet another aspect of the present invention, a haptic feedback mouse device provides haptic sensations to a user and includes a device housing physically contacted by the user and movable in an x-y plane, where the device housing includes a movable portion and a main portion. At least part of the movable portion is positioned on a side of the housing and is movable with respect to the main portion. A linear actuator has an actuator housing coupled to the device housing and an actuated portion coupled to the movable portion, where the linear actuator moves the movable portion of the device housing linearly away from the main portion of the housing when controlled with a control signal, thereby providing a haptic sensation to a user contacting the movable portion. A sensor outputs a sensor signal indicative of housing movement in the x-y plane. Preferably, the movable portion engages a thumb of the user in normal operation of the mouse device.

The present invention advantageously provides embodiments for a low-cost haptic feedback device that can output a variety of haptic sensations. The actuators can be implemented in existing interface devices with relatively little added expense. The presented features allow precision in the control of haptic sensations and a compelling range of sensations to be experienced by the user.

These and other advantages of the present invention will become apparent to those skilled in the art upon a reading of the following specification of the invention and a study of the several figures of the drawing.

BRIEF DESCRIPTION OF THE DRAWINGS

FIG. 6b is a perspective view of the top and side of the haptic mouse device of FIG. 6a;

DETAILED DESCRIPTION OF PREFERRED EMBODIMENTS

Many of the described embodiments of the present invention add haptic functionality to existing mouse designs. Various actuators and assemblies are preferably provided in a mouse housing in ways that do not require significant design and manufacturing changes to the product. Mice produced according to these embodiments can fall within the standard mouse price range, and these embodiments add significant new value without forcing the computer user to re-think how he or she uses the mouse.

The below descriptions often refer to a mouse device as a specific embodiment of an interface device which is suitable for the embodiments of the present invention. However, the inventive embodiments described herein are also suitable for a wide variety of other types of computer interface devices which can be enhanced with haptic feedback, including trackballs, gamepad controllers, joysticks, steering wheels, styluses, touchpads, touchscreens, light guns, remote controls, portable computers, knobs, etc.

Figure 1:
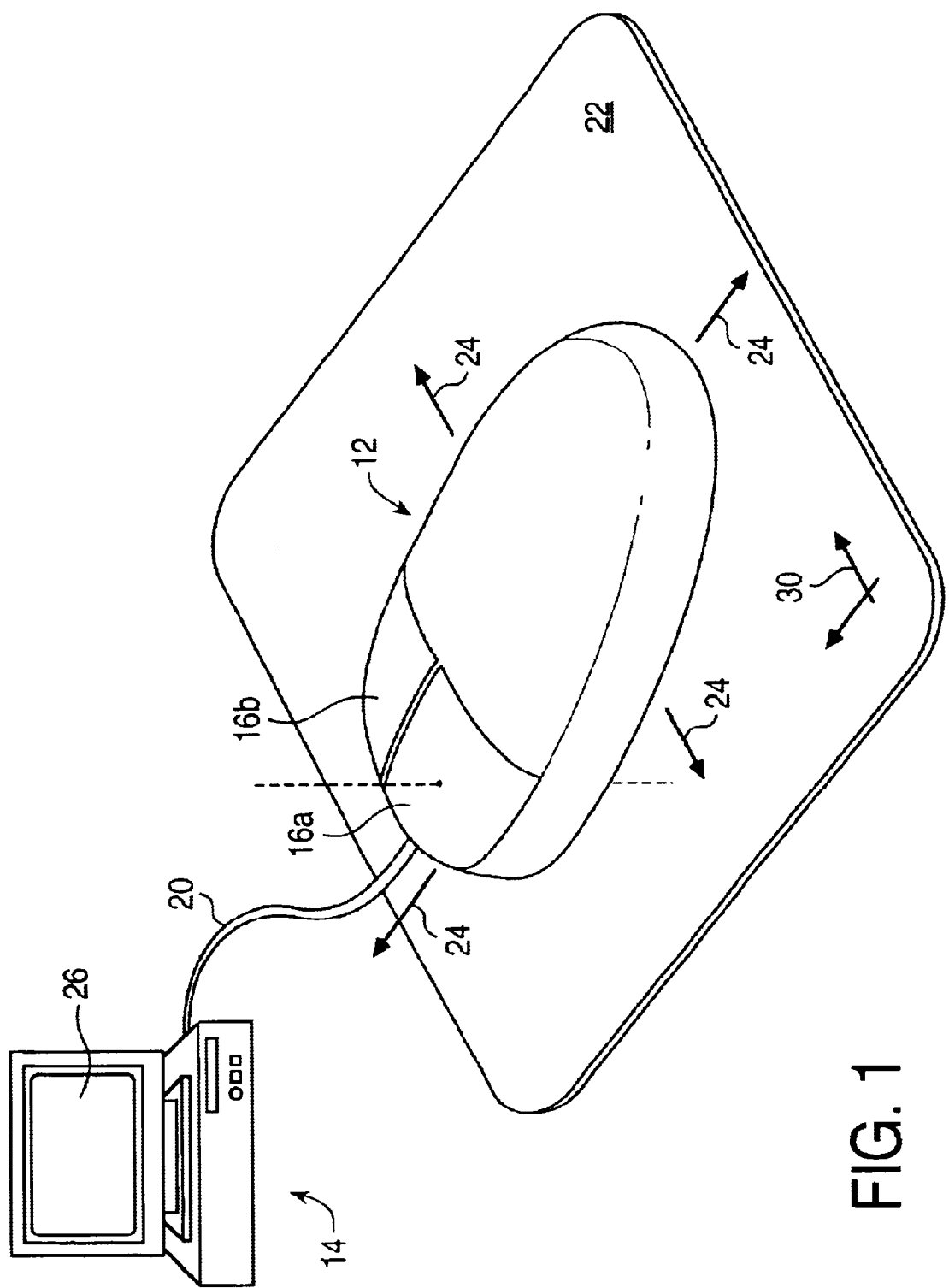
FIG. 1 is a perspective view of an interface device system incorporating a haptic feedback device present invention.

FIG. 1 is a perspective view of a haptic feedback mouse interface system 10 of the present invention capable of providing input to a host computer and capable of providing haptic feedback to the user of the mouse system. Mouse system 10 includes a mouse 12 and a host computer 14. It should be noted that the term "mouse" as used herein, indicates an object generally shaped to be grasped or contacted from above and moved within a substantially planar workspace (and additional degrees of freedom if available).

Mouse 12 is an object that is preferably grasped or gripped and manipulated by a user. For example, a user can move mouse 12 to provide planar two-dimensional input to a computer system to correspondingly move a computer generated graphical object, such as a cursor or other image, in a graphical environment provided by computer 14 or to control a virtual character, vehicle, or other entity in a game or simulation. In addition, mouse 12 preferably includes one or more buttons 16a and 16b to allow the user to provide additional commands to the computer system. Each button can typically be pressed down in the degree of freedom of the button for a travel distance, at the end of which a button switch is closed and a button signal provided to the host computer to indicate the button has been pressed.

Mouse 12 preferably includes one or more actuators 18 which operative to produce tactile forces on the mouse housing 12, a portion thereof, and/or a button 16. This operation is described in greater detail below with reference to FIGS. 3a–7.

Mouse 12 rests on a ground surface 22 such as a tabletop or mousepad. A user grasps the mouse 12 and moves the mouse in a planar workspace on the surface 22 as indicated by arrows 24. Mouse 12 may be moved anywhere on the ground surface 22, picked up and placed in a different location, etc. A frictional ball and roller assembly (not shown) can in some embodiments be provided on the underside of the mouse 12 to translate the planar motion of the mouse 12 into electrical position signals, which are sent to a host computer 14 over a bus 20 as is well known to those skilled in the art. In other embodiments, different mechanisms and/or electronics can be used to convert mouse motion to position or motion signals received by the host computer. For example, optical sensors can be used; a suitable optical mouse technology is made by Hewlett Packard of Palo Alto, Calif., where both the optical emitter and detector are provided on the mouse housing and detect motion of the mouse relative to the planar support surface by optically taking and storing a number of images of the surface and comparing those images over time to determine if the mouse has moved. Alternatively, a portion of an optical sensor can be built into the surface 22 to detect the position of an emitter or transmitter in mouse 12 and thus detect the position of the mouse 12 on the surface 22. Mouse 12 is preferably a relative device, in which its sensor detect a change in position of the mouse, allowing the mouse to be moved over any surface at any location. An absolute mouse may also be used, in which the absolute position of the mouse is known but the mouse is typically limited to a particular predefined workspace.

Mouse 12 is coupled to the computer 14 by a bus 20, which communicates signals between mouse 12 and computer 14 and may also, in some preferred embodiments, provide power to the mouse 12. Components such as actuator 18 require power that can be supplied from a conventional serial port or through an interface such as a USB or Firewire bus. In other embodiments, signals can be sent between mouse 12 and computer 14 by wireless transmission/reception. In some embodiments, the power for the actuator can be supplemented or solely supplied by a power storage device provided on the mouse, such as a capacitor or one or more batteries. Some embodiments of such are disclosed in U.S. Pat. No. 5,691,898, incorporated herein by reference.

Host computer 14 can be a personal computer or workstation, such as a PC compatible computer or Macintosh personal computer, or a Sun or Silicon Graphics workstation. For example, the computer 14 can operate under the Windows™, MacOS, Unix, or MS-DOS operating system. Alternatively, host computer system 14 can be one of a variety of home video game console systems commonly connected to a television set or other display, such as systems available from Nintendo, Sega, or Sony. In other embodiments, host computer system 14 can be a "set top box" which can be used, for example, to provide interactive television functions to users, or a "network-" or "internet-computer" which allows users to interact with a local or global network using standard connections and protocols such as used for the Internet and World Wide Web. Host computer preferably includes a host microprocessor, random access memory (RAM), read only memory (ROM), input/output (I/O) circuitry, and other components of computers well-known to those skilled in the art.

Host computer 14 preferably implements a host application program with which a user is interacting via mouse 12 and other peripherals, if appropriate, and which may include force feedback functionality. For example, the host application program can be a video game, word processor or spreadsheet, Web page or browser that implements HTML or VRML instructions, scientific analysis program, virtual reality training program or application, or other application program that utilizes input of mouse 12 and outputs force feedback commands to the mouse 12. Herein, for simplicity, operating systems such as Windows™, MS-DOS, MacOS, Linux, Be, etc. are also referred to as "application programs." In one preferred embodiment, an application program utilizes a graphical user interface (GUI) to present options to a user and receive input from the user. Herein, computer 14 may be referred as providing a "graphical environment,", which can be a graphical user interface, game, simulation, or other visual environment. The computer displays "graphical objects" or "computer objects," which are not physical objects, but are logical software unit collections of data and/or procedures that may be displayed as images by computer 14 on display screen 26, as is well known to those skilled in the art. A displayed cursor or a simulated cockpit of an aircraft might be considered a graphical object. The host application program checks for input signals received from the electronics and sensors of mouse 12, and outputs force values and/or commands to be converted into forces output for mouse 12. Suitable software drivers which interface such simulation software with computer input/output (I/O) devices are available from Immersion Corporation of San Jose, Calif.

Display device 26 can be included in host computer 14 and can be a standard display screen (LCD, CRT, flat panel, etc.), 3-D goggles, or any other visual output device. Typically, the host application provides images to be displayed on display device 26 and/or other feedback, such as auditory signals. For example, display screen 26 can display images from a GUI.

In alternative embodiments, the mouse can be a different interface or control device. For example, a hand-held remote control device used to select functions of a television, video cassette recorder, sound stereo, internet or network computer (e.g., Web-™), or a gamepad controller for video games or computer games, can be used with the haptic feedback components described herein.

Figure 2:
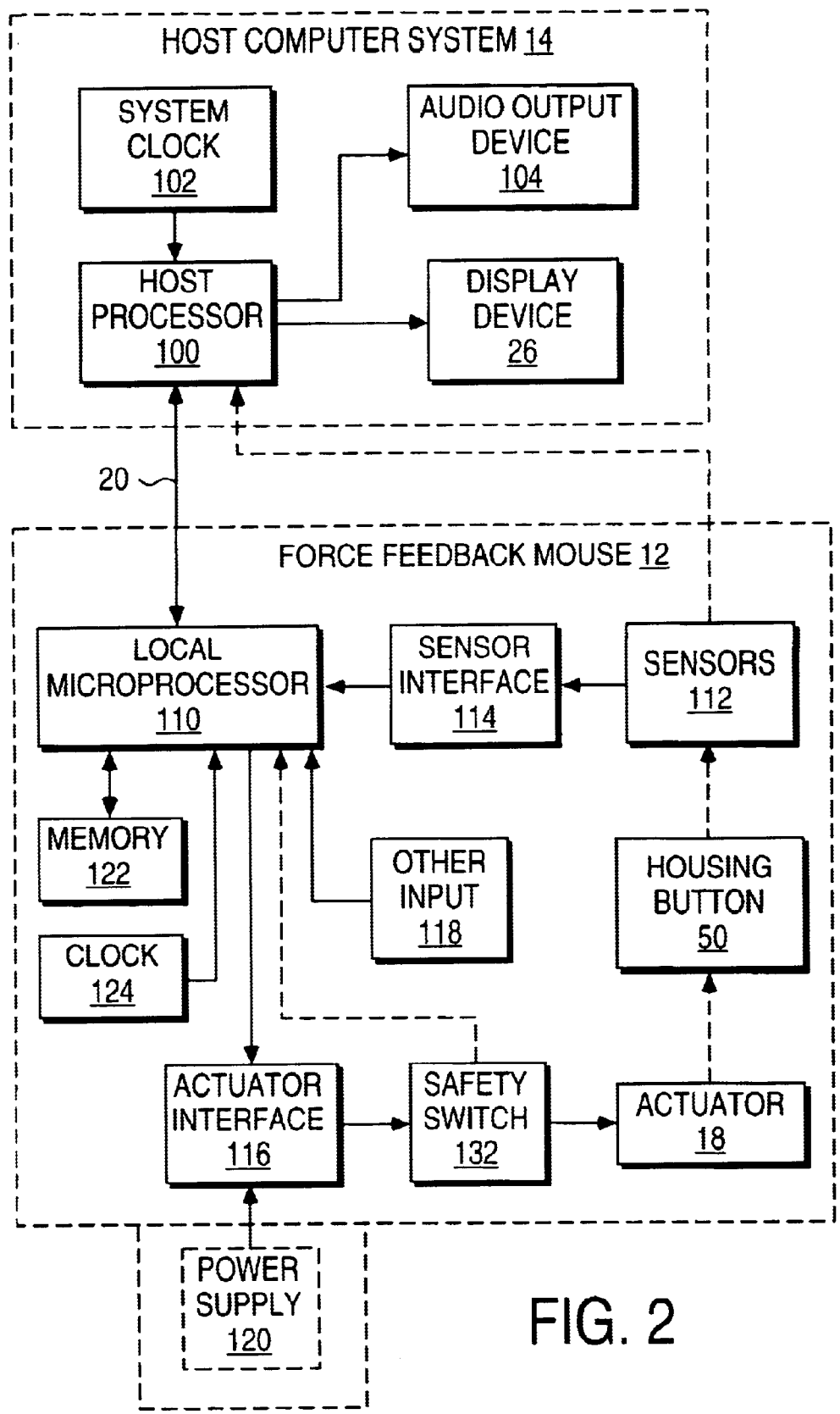
FIG. 2 is a block diagram of a haptic feedback system suitable for use with the present invention.

FIG. 2 is a block diagram illustrating one embodiment of the force feedback system suitable for use with any of the described embodiments of the present invention and including a local microprocessor and a host computer system.

Host computer system 14 preferably includes a host microprocessor 100, a clock 102, a display screen 26, and an audio output device 104. The host computer also includes other well known components, such as random access memory (RAM), read-only memory (ROM), and input/output (I/O) electronics (not shown). Display screen 26 displays images of a game environment, operating system application, simulation, etc. Audio output device 104, such as speakers, is preferably coupled to host microprocessor 100 via amplifiers, filters, and other circuitry well known to those skilled in the art and provides sound output to user when an "audio event" occurs during the implementation of the host application program. Other types of peripherals can also be coupled to host processor 100, such as storage devices (hard disk drive, CD ROM drive, floppy disk drive, etc.), printers, and other input and output devices.

Mouse 12 is coupled to host computer system 14 by a bidirectional bus 20 The bi-directional bus sends signals in either direction between host computer system 14 and the interface device. Bus 20 can be a serial interface bus, such as an RS232 serial interface, RS-422, Universal Serial Bus (USB), MIDI, or other protocols well known to those skilled in the art; or a parallel bus or wireless link. For example, the USB standard provides a relatively high speed interface that can also provide power to actuator 18.

Mouse 12 can include a local microprocessor 110. Local microprocessor 110 can optionally be included within the housing of mouse 12 to allow efficient communication with other components of the mouse. Processor 110 is considered local to mouse 12, where "local" herein refers to processor 110 being a separate microprocessor from any processors in host computer system 14. "Local" also preferably refers to processor 110 being dedicated to haptic feedback and sensor I/O of mouse 12. Microprocessor 110 can be provided with software instructions (e.g., firmware) to wait for commands or requests from computer host 14, decode the command or request, and handle/control input and output signals according to the command or request. In addition, processor 110 can operate independently of host computer 14 by reading sensor signals and calculating appropriate forces from those sensor signals, time signals, and stored or relayed instructions selected in accordance with a host command. Suitable microprocessors for use as local microprocessor 110 include the MC68HC711E9 by Motorola, the PIC16C74 by Microchip, and the 82930AX by Intel Corp., for example, as well as more sophisticated force feedback processors such as the Immersion Touchsense Processor. Microprocessor 110 can include one microprocessor chip, multiple processors and/or coprocessor chips, and/or digital signal processor (DSP) capability.

Microprocessor 110 can receive signals from sensor 112 and provide signals to actuator 18 in accordance with instructions provided by host computer 14 over bus 20. For example, in a local control embodiment, host computer 14 provides high level supervisory commands to microprocessor 110 over bus 20, and microprocessor 110 decodes the commands and manages low level force control loops to sensors and the actuator in accordance with the high level commands and independently of the host computer 14. This operation is described in greater detail in U.S. Pat. Nos. 5,739,811 and 5,734,373, both incorporated by reference herein. In the host control loop, force commands are output from the host computer to microprocessor 110 and instruct the microprocessor to output a force or force sensation having specified characteristics. The local microprocessor 110 reports data to the host computer, such as locative data that describes the position of the mouse in one or more provided degrees of freedom. The data can also describe the states of buttons 16 and safety switch 132. The host computer uses the locative data to update executed programs. In the local control loop, actuator signals are provided from the microprocessor 110 to actuator 18 and sensor signals are provided from the sensor 112 and other input devices 118 to the microprocessor 110. Herein, the term "tactile sensation" refers to either a single force or a sequence of forces output by the actuator 18 which provide a sensation to the user. For example, vibrations, a single jolt, or a texture sensation are all considered tactile sensations. The microprocessor 110 can process inputted sensor signals to determine appropriate output actuator signals by following stored instructions. The microprocessor may use sensor signals in the local determination of forces to be output on the user object, as well as reporting locative data derived from the sensor signals to the host computer.

In yet other embodiments, other hardware can be provided locally to mouse 12 to provide functionality similar to microprocessor 110. For example, a hardware state-machine incorporating fixed logic can be used to provide signals to the actuator 18 and receive sensor signals from sensors 112, and to output tactile signals according to a predefined sequence, algorithm, or process. Techniques for implementing logic with desired functions in hardware are well known to those skilled in the art. Such hardware can be better suited to less complex force feedback devices, such as the device of the present invention.

In a different, host-controlled embodiment, host computer 14 can provide low-level force commands over bus 20, which are directly transmitted to the actuator 18 via microprocessor 110 or other circuitry. Host computer 14 thus directly controls and processes all signals to and from the mouse 12, e.g. the host computer directly controls the forces output by actuator 18 and directly receives sensor signals from sensor 112 and input devices 118. This embodiment may be desirable to reduce the cost of the force feedback device yet further, since no complex local microprocessor 110 or other processing circuitry need be included in the mouse. Furthermore, since one actuator 18 is used with forces not provided in the primary sensed degrees of freedom, the local control of forces by microprocessor 110 may not be necessary in the present invention to provide the desired quality of forces. Other embodiments may employ a "hybrid" organization where some types of force effects (e.g. closed loop effects or high frequency effects) are controlled purely by the local microprocessor, while other types of effects (e.g., open loop or low frequency effects) may be controlled by the host.

In the simplest host control embodiment, the signal from the host to the device can be a single bit that indicates whether to pulse the actuator at a predefined frequency and magnitude. In a more complex embodiment, the signal from the host could include a magnitude, giving the strength of the desired pulse. In yet a more complex embodiment, the signal can include a direction, giving both a magnitude and a sense for the pulse. In still a more complex embodiment, a local processor can be used to receive a simple command from the host that indicates a desired force value to apply over time. The microprocessor then outputs the force value for the specified time period based on the one command, thereby reducing the communication load that must pass between host and device. In an even more complex embodiment, a high-level command with tactile sensation parameters can be passed to the local processor on the device which can then apply the full sensation independent of host intervention. Such an embodiment allows for the greatest reduction of communication load. Finally, a combination of numerous methods described above can be used for a single mouse device 12.

Local memory 122, such as RAM and/or ROM, is preferably coupled to microprocessor 110 in mouse 12 to store instructions for microprocessor 110 and store temporary and other data. For example, force profiles can be stored in memory 122, such as a sequence of stored force values that can be output by the microprocessor, or a look-up table of force values to be output based on the current position of the user object. In addition, a local clock 124 can be coupled to the microprocessor 110 to provide timing data, similar to system clock 18 of host computer 12; the timing data might be required, for example, to compute forces output by actuator 18 (e.g., forces dependent on calculated velocities or other time dependent factors). In embodiments using the USB communication interface, timing data for microprocessor 110 can be alternatively retrieved from the USB signal.

In some embodiments, host computer 14 can send a "spatial representation" to the local microprocessor 110, which is data describing the locations of some or all the graphical objects displayed in a GUI or other graphical environment which are associated with forces and the characteristics of these graphical objects. The microprocessor can store such a spatial representation in local memory 122, and thus will be able to determine interactions between the user object and graphical objects (such as the rigid surface) independently of the host computer. Also, the local memory can store predetermined force sensations for the microprocessor that are to be associated with particular types of graphical objects.

Sensors 112 sense the position or motion of the mouse device (e.g. the housing 50) in its planar degrees of freedom and provides signals to microprocessor 110 (or host 14)

including information representative of the position or motion. Sensors suitable for detecting planar motion of a mouse include digital optical encoders frictionally coupled to a rotating ball or cylinder, as is well known to those skilled in the art. Optical sensor systems, linear optical encoders, potentiometers, optical sensors, velocity sensors, acceleration sensors, strain gauge, or other types of sensors can also be used, and either relative or absolute sensors can be provided. Optional sensor interface 114 can be used to convert sensor signals to signals that can be interpreted by the microprocessor 110 and/or host computer system 14, as is well known to those skilled in the art.

Actuator(s) 18 transmits forces to the housing 50, button 16, or other portion of the mouse in response to signals received from microprocessor 110 and/or host computer 14, and is described in greater detail below. Many types of actuators can be used, including a rotary DC motors, voice coil actuators, moving magnet actuators, pneumatic/hydraulic actuators, solenoids, speaker voice coils, piezoelectric actuators, passive actuators (brakes), etc. In many of the implementations herein, the actuator has the ability to apply short duration force sensation on the housing or handle of the mouse. This short duration force sensation is described herein as a "pulse" The "pulse" can be directed substantially along a Z axis orthogonal to the X-Y plane of motion of the mouse. In progressively more advanced embodiments, the magnitude of the "pulse" can be controlled; the sense of the "pulse" can be controlled, either positive or negative biased; a "periodic force sensation" can be applied on the handle of the mouse, where the periodic sensation can have a magnitude and a frequency, e.g. a sine wave; the periodic sensation can be selectable among a sine wave, square wave, saw-toothed-up wave, saw-toothed-down, and triangle wave; an envelope can be applied to the period signal, allowing for variation in magnitude over time; and the resulting force signal can be "impulse wave shaped" as described in U.S. Pat. No. 5,959,613. There are two ways the period sensations can be communicated from the host to the device. The wave forms can be "streamed" as described in U.S. Pat. No. 5,959,613 and provisional patent application No. 60/160,401, both incorporated herein by reference in their entirety. Or the waveforms can be conveyed through high level commands that include parameters such as magnitude, frequency, and duration, as described in U.S. Pat. No. 5,734,373.

Alternate embodiments can employ additional actuators for providing tactile sensations or forces in the planar degrees of freedom of the mouse 12. For example, the mouse can be enhanced with a secondary actuator. Because of power constraints, this secondary means can be passive (i.e., it dissipates energy) in some embodiments. The passive actuator can be a brake, such as a magneto-rheological fluid brake or magnetic brake. The passive braking means can be employed through a frictional coupling between the mouse housing and the table surface 22. When the brake is engaged, the user can feel the passive resistance to motion of the mouse (in one or two degrees of freedom). Actuator interface 116 can be optionally connected between actuator 18 and microprocessor 110 to convert signals from microprocessor 110 into signals appropriate to drive actuator 18. Interface 38 can include power amplifiers, switches, digital to analog controllers (DACs), analog to digital controllers (ADCs), and other components, as is well known to those skilled in the art.

Other input devices 118 are included in mouse 12 and send input signals to microprocessor 110 or to host 14 when manipulated by the user. Such input devices include buttons 16 and can include additional buttons, dials, switches, scroll wheels, or other controls or mechanisms.

Power supply 120 can optionally be included in mouse 12 coupled to actuator interface 116 and/or actuator 18 to provide electrical power to the actuator or be provided as a separate component. Alternatively, and more preferably, power can be drawn from a power supply separate from mouse 12, or power can be received across a USB or other bus. Also, received power can be stored and regulated by mouse 12 and thus used when needed to drive actuator 18 or used in a supplementary fashion, as described in copending application Ser. No. 09/456,887, filed Dec. 7, 1999, and incorporated herein by reference in its entirety. A safety switch 132 can optionally be included to allow a user to deactivate actuator 18 for safety reasons.

Embodiments of the Present Invention

Several embodiments of mouse interface device 12 providing haptic sensations to the user are described below. Preferred embodiments provide one or more of several desirable characteristics for a haptic mouse designed for the consumer market. One desirable characteristic is that the mouse should feel like it is "alive" to the user, like the forces are coupling into the user's body. The "alive" quality is often determined by system compliance, actuator authority, and transmissibility into the hand. Furthermore, it is preferred that the moving member or portion be spring centered so that vibrations/forces do not disappear or get clipped. Preferably, user effort is not required to maintain contact with the moving feedback surface while using the mouse. The mouse preferably also provides feedback for a range of user grip postures, e.g. palming, gripping, and finger tip usage. If possible, the haptic feedback should be in an axis that is substantially de-coupled from position input in the x-y plane. Preferably, the haptic feedback does not interfere with button operation by the user or button closure perception, and the mouse should work seamlessly as a normal mouse when the user is not paying attention to forces. The mouse should have very good fidelity at high frequencies (e.g., 200 to 20 Hz) and convey lower frequencies (e.g., <20 Hz) with enough displacement that they are perceptible. Overall, the haptic mouse should add value with minimal sacrifice and cost.

Figure 3A:
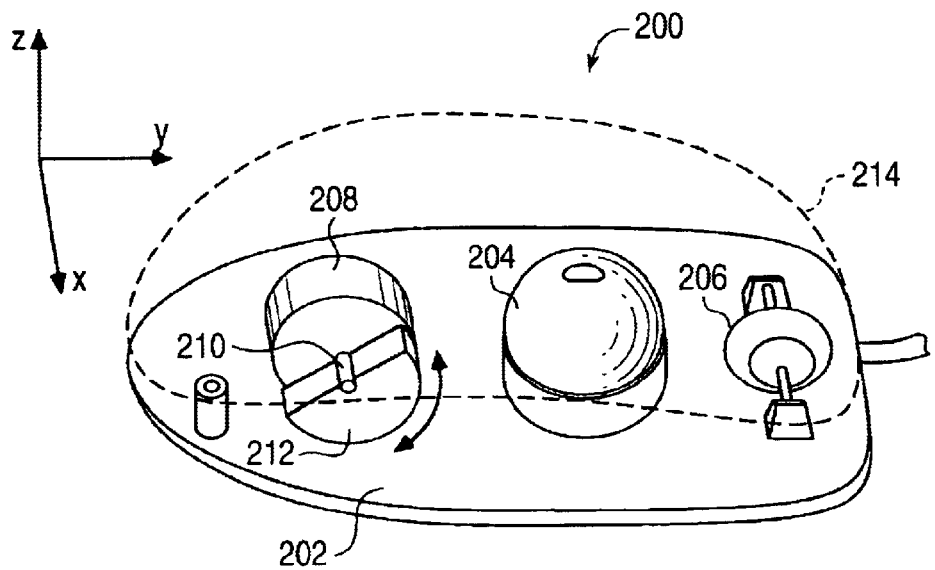
FIG. 3a is a perspective view of a first embodiment of a haptic mouse interface device including a eccentric rotating mass providing inertial haptic sensations.

FIG. 3a is a perspective view of a mouse device 200 providing tactile sensations to a user with an eccentric rotating mass to provide inertial forces, such as vibrations. A lower base portion 202 of the mouse housing can include a ball sensor 204, a mouse wheel 206, circuits (not shown), and other standard components. In addition, a rotary motor 208 can be coupled to the base 202, where a rotary shaft 210 of the motor is coupled to an eccentric mass 212 positioned so that the center of mass of the mass 212 is offset from the center of rotation of the shaft 210. A cover portion 214, shown in dashed lines, can be normally positioned over the base portion 202.

The eccentric mass 212 is rotated by the motor 208 to cause inertial tactile sensations on the mouse housing. The inertial sensations are caused by the inertia produced by the eccentric rotation of the mass, which causes a wobbling motion that is transmitted through actuator to the housing. The user contacting the housing can feel the sensations. The sensations can be determined from host commands, signals, or local determination, as explained above. In one embodiment, the mass 212 is rotated in a single direction. In another embodiment, the mass 212 can be rotated harmonically (in two directions). Some mouse embodiments can allow both uni-directional and bi-directional modes, e.g. a host command from the host computer can determine which mode is currently operational.

In embodiment 200, the motor 208 is positioned such that the eccentric mass 212 rotates in approximately the y-z plane, where the shaft of the motor extends parallel to the x-axis. Thus, the inertial forces output by the rotation of the mass are along the y- and z-axes. If the mass is rotated quickly enough and/or if the inertial forces on the housing are of high enough magnitude, the mouse may be moved or vibrated along the y-axis and the portion of the forces output in the y-axis may cause a controlled object, such as a displayed cursor, to change its y position in a graphical environment in response to motor activation. If this effect is undesired, it can be alleviated in some embodiments by providing a selective disturbance filter, as described in U.S. Pat. No. 6,020,876 and incorporated herein by reference in its entirety.

The embodiment 200 can produce strong forces to the user if the mass 212 is rotated quickly. In some embodiments, forces output to the user can be dependent on the initial state of the motor/mass. For example, if the eccentric mass were initially positioned at the bottom of its rotational range, a "pop" sensation (e.g. one or a small number of quick mass rotations) would feel different than if the mass were initially positioned at the top of its range. Rotating mass control firmware and a sensor that reads mass rotational position may be used to improve the eccentric mass control and make particular force sensations always feel the same. For example, copending application Ser. No. 09/669,029, filed Sep. 25, 2000, describes methods to control an eccentric rotating mass that can be used in the present invention, and is incorporated herein by reference in its entirety. A harmonic drive, in which the mass is driven in both directions about its rotational axis, higher-fidelity force effects may, in general, be obtained, as described in copending application Ser. No. 09/608,125, which is incorporated herein by reference in its entirety. Also, firmware or control software can be used to translate low frequency periodic drive signals into short duration pulses that start the mass moving from a known position.

In some embodiments, the eccentric mass 212 can be driven harmonically (bi-directionally) against one or more stop members, such as pins, that are coupled to the base 202 or cover 214 of the mouse housing. The impact force of the mass against the stop members causes different types of force sensations that can be provided instead of or in addition to inertial sensations. Sensations resulting from such stop members is described in greater detail below.

Figure 3B:
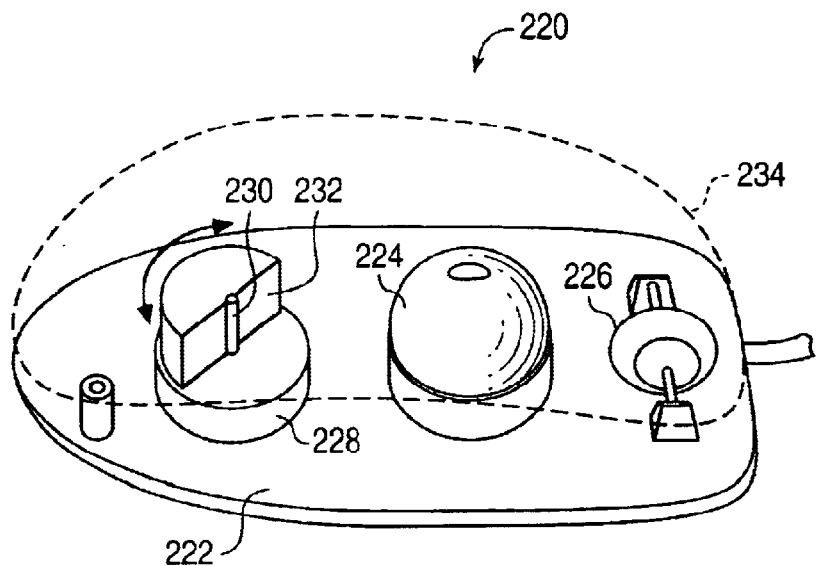
FIG. 3b is a perspective view of a second embodiment of a haptic mouse interface device including a eccentric rotating mass providing inertial haptic sensations.

FIG. 3b is a perspective view of a mouse device 220 providing tactile sensations to a user with an eccentric rotating mass. Embodiment 220 is similar to mouse 200 described above, and can include a lower base portion 222, a ball (or other type) sensor 224, a mouse wheel 226, circuits (not shown), and other standard components. A rotary motor 228 can be coupled to the base 222, where a rotary shaft 230 of the motor is coupled to an eccentric mass 232 positioned so that the center of mass of the mass 232 is offset from the center of rotation of the shaft 230. A cover portion 234, shown in dashed lines, can be normally positioned over the base portion 222.

Embodiment 220 differs from embodiment 200 in that the motor 228 is positioned such that the shaft 230 is parallel to the z-axis and rotates the eccentric mass 232 in the x-y plane. The inertial sensations are similar to those produced by embodiment 220, except that the forces are provided in the x-y plane. If the inertial sensations are low enough magnitude, then targeting activities of the mouse are typically unaffected. If the inertial sensations are strong enough, however, they may cause the mouse and any controlled graphical object to be moved in the x-y plane, possibly throwing off the cursor from a desired target, and thus may be more undesirable than the embodiment 200 which only may cause mouse movement along the y-axis. Smaller masses 232 (and thus smaller forces) can reduce the disturbances. This embodiment may be suitable as an "anti-targeting" device; e.g. a particular game or other application may require or desire forces that prevent a user from targeting a cursor or other object accurately. The other features described for embodiment 200 can also be employed for embodiment 220.

Figure 4:
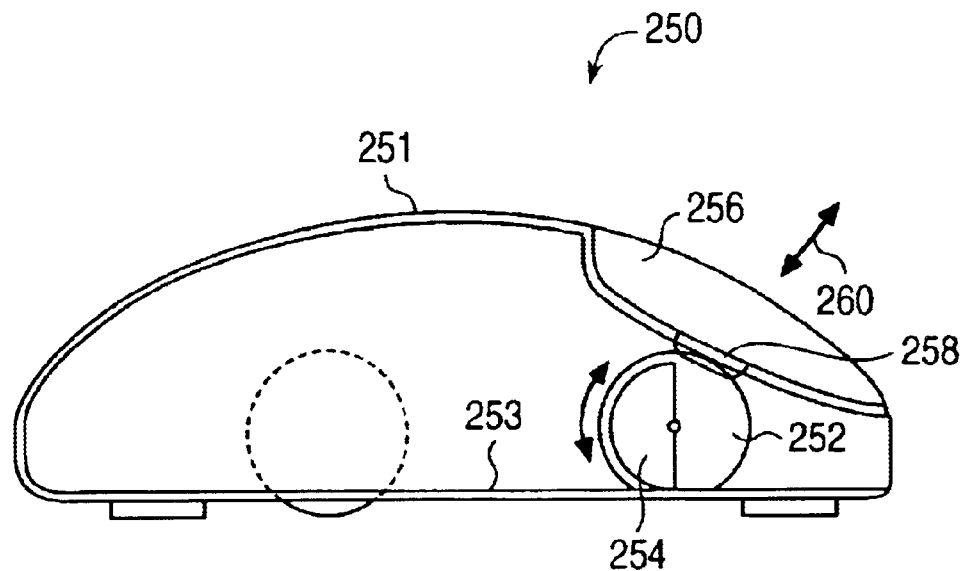
FIG. 4 is a side elevational view of a haptic mouse interface device including an eccentric rotating mass influencing a magnetic button.

FIG. 4 is a side elevational view of another embodiment 250 of a tactile mouse which can output haptic sensations on a mouse button or other moveable portion of an interface device. Mouse 250 can include the standard device components detailed above. Mouse 250 includes a motor 252 coupled to the housing of the mouse, such as a DC rotary (e.g. pager) motor or other type of actuator, and which rotates an eccentric mass 254. For example, the motor 252 is mounted to the bottom 253 of the mouse housing 251 in the embodiment shown. The mass can be rotated in any configuration, but the rotating motor shaft is preferably oriented in the x-y plane so that the eccentric mass 254 rotates in a y-z plane or an x-z plane, or a combination of both. Mouse 250 also includes a button 256 to which a permanent magnet 258 is coupled. In the embodiment shown, the magnet 258 is coupled to the underside of the button 256. Button 256 is hinged and can move approximately as shown by arrow 260. The user can depress the button to activate a switch and send a button signal to the host computer, as is well known on mouse and other interface devices.

The eccentric mass 254 can be controlled similarly to the eccentric masses described above to provide inertial tactile sensations to the user contacting the housing of the mouse. For example, the mass 254 can be rotated in one direction or can be controlled harmonically to move in two directions about its rotational axis to provide the desired inertial sensations. The harmonic control tends to more efficiently couple vibrations to the housing inertially at higher frequencies.

Furthermore, embodiment 250 allows tactile sensations to be output on the button 256. When the eccentric mass 254 is rotated to the top of its rotational range, i.e., its closest position to the magnet 258, the mass magnetically influences the button 256 by attracting the magnet 258 toward the mass 254. For example, the mass 254 can be made of a metal, such as iron or steel, that magnetically interacts with the magnet 258. If the magnetic attraction force is strong enough, it may cause the button 256 to move in the direction toward the mass 254; however, the forces are preferably made sufficiently weak to not cause the button switch to close. This allows the user to press the button when desired with little or no interference from forces output in the button's degree of freedom. For example, the button travel range can be made large enough and can include a sensor to detect button position, so that when the button reaches a position near to the button switch, the forces are reduced by moving the mass away, allowing a button click uninfluenced by the magnetic forces.

As the mass 254 rotates away from the magnet 258, the magnetic attraction force reduces in magnitude, and the button 256 is allowed to move back to its origin position due to a physical centering spring provided on the button 256 (e.g., the centering spring can be provided within the hinge of the button, or is a separate physical spring). Thus, the button 256 experiences an oscillating magnetic force (e.g., a vibration) if the mass 254 is continually rotated in one direction, where the frequency of oscillation is controlled by the frequency of rotation of the mass. If the user is contacting the button, the user experiences haptic sensations through the button; these sensations may include actual motion of the button up or down in the degree of freedom of the button. The user also may experience inertial tactile sensations through the housing of the mouse caused by the rotation of the eccentric mass.

Alternatively, the motor 252 and eccentric mass 254 can be used to impart forces in the degree of freedom of the button 256 in a "kinesthetic button mode." In this mode, kinesthetic forces such as resistance to movement of the button in its degree of freedom, spring forces in the button degree of freedom, damping forces in the button degree of freedom, etc., can be output. A particular magnitude of the kinesthetic force is determined by the position of the mass with respect to the magnet at that point in time. Thus, a strong attraction (or resistive) force is applied when the mass is very close to the magnet, while a weaker attraction (or resistance) is applied when the mass has been rotated to a position further from the magnet. Mass position can be modulated according to the desired relationship, e.g. a spring force is created by providing a resistive force having a magnitude based on the current position of the button 256 in its degree of freedom (the current button position can be read by a dedicated sensor). A mapping of eccentric mass position to resistance (or attractive force) magnitude can be provided, e.g. the local microprocessor can access such a mapping to determine how to control mass position.

If the eccentric mass is made of a metal such as iron or steel, the force between magnet and mass are attractive. In other embodiments, the mass 254 can be made of a permanent magnetic material. Depending on the polarities of the sides of the magnet 258 and mass 254 facing each other, the magnetic force will then either be attractive or repulsive, allowing either an attractive or repulsive force on the button 256. In some embodiments, both attractive and repulsive forces can be implemented, and either can be selected by the local microprocessor, host computer, etc. For example, if flux is added or subtracted from a steel or iron mass 254, attractive or repulsive forces can be implemented. For example, a wire coil can be wrapped around the mass 254 and a current flowed therethrough (the current can be controlled by a local processor, for example), allowing flux to be added or subtracted and thus allowing both attractive and repulsive forces to be implemented.

In some embodiments, the mass can also be rotated bi-directionally using harmonic control, as described above. For example, a sine wave can control the harmonic motion of the mass, allowing vibrations to be imparted on the button 256.

The mouse can also be provided with multiple different modes, each mode moving the mass in a different way or according to a different control method to produce a different type of haptic sensation. For example, firmware on the mouse processor, and/or host software, can selectively control this multiple-mode ability. For example, tactile and kinesthetic modes can be provided. In one example, when the cursor is moved within a displayed window, a vibration can be output on the button 256 in tactile mode. When the user presses the button to select an icon in that window, kinesthetic mode can be initiated and a spring force can be output on the button to resist the button's motion downward (or attract the button to decrease the force necessary for the user to push the button). Other embodiments can also or alternatively include harmonic and uni-directional mass rotation modes for different types of tactile sensations.

Multiple buttons of the mouse or other interface device can include a magnet 258. Each button can have an eccentric motor/mass dedicated to that button, or multiple buttons can be magnetically influenced by a single motor and/or eccentric mass. In yet other embodiments, other moving portions of the mouse 250 can be provided with a magnet similar to magnet 258 and be moved with respect to the "base portion" of the mouse, which in this embodiment is the remaining portion of the housing except the movable portion. For example, a cover portion of the mouse hinged to the base portion can be provided with a magnet so that the entire cover portion is vibrated or induced with magnetic forces based on the position of the eccentric mass 254 during its rotation. Or, a portion of the housing that is pivotally or translatably coupled to the rest of the housing can be magnetically influenced. Some embodiments of moveable mouse portions are described in U.S. Pat. No. 6,088,019, incorporated herein by reference in its entirety.

Figure 5:
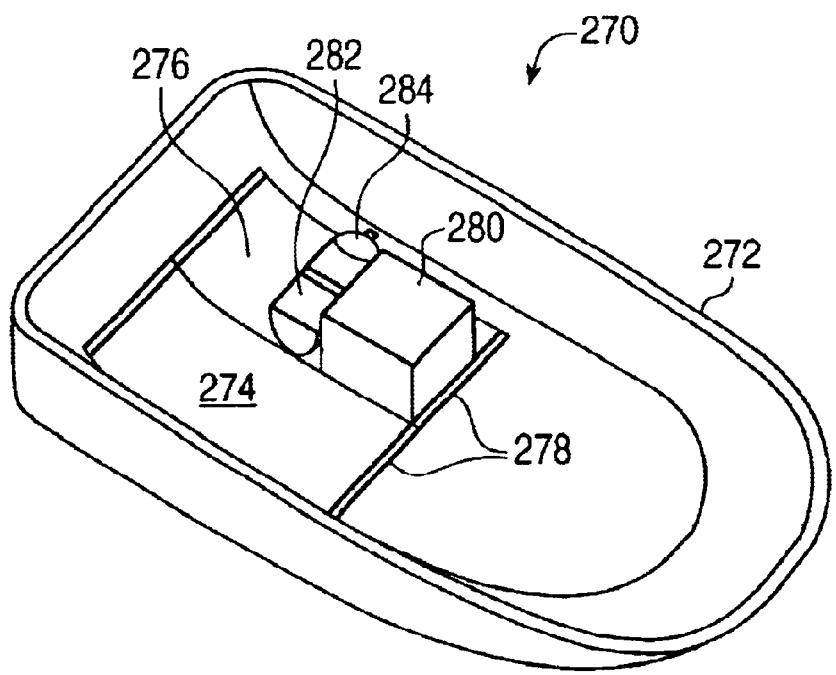
FIG. 5 is a perspective view of a haptic mouse interface device including an eccentric rotating mass engaging a stop member to provide haptic sensations.

FIG. 5 is a perspective view of another embodiment 270 of a mouse providing haptic sensations on a button. The upper portion 272 of mouse 270 is shown, which is intended to mate with a bottom portion, e.g. a base similar to those shown with respect to FIGS. 3*a* and 3*b*, or other type of base. Two mouse buttons 274 and 276 are shown from the underside of the upper portion 272. The buttons 274 and 276 are coupled to the housing portion 272 at a hinge 278. The housing of a rotary motor 280 is coupled directly to the button 276 such that the button 276 can still be moved and pressed by the user in normal fashion; when the button is moved, the motor 280 is also moved. An eccentric mass 282 is coupled to a rotating shaft 284 of the motor 280. The mass 282 can be similar to the eccentric masses described above.

A number of eccentric rotating mass motors, voice-coils, speaker actuators, and/or other types of actuators can be attached to a displaceable surface of the mouse, such as the mouse button 276 or a moveable portion of the top or side of the mouse housing, for example. These actuators can all produce a vibration on the displaceable surface. Thus, a freely-rotating mass 282 will produce a vibration on the button 276 to which the motor 280 is attached due to the inertial forces. Some actuators are capable of harmonic drive, providing high bandwidth at the expense of power consumption. Harmonically-driven actuators are able to produce vibrations as well as "clicks", e.g. single pulses of force.

In other embodiments, an grounded stop 284 can be positioned in the rotatable range of the mass 282 to block the rotation of the mass. For example, the stop 284 can be a pin or screw that is mounted to the housing 272 and extends into the rotational range of the mass. In unidirectional operation, a force can be applied to the button 276 by driving the mass 282 against the stop 284. Since the stop 284 is grounded, this causes the motor 280 and button 276 to move in the degree of freedom of the button as the mass 282 pushes against the stop 284. In some embodiments, the resulting force may not be of sufficient magnitude to actually move the button and motor, but a force is applied to the motor and button in the button's degree of freedom.

Alternatively, the actuator 280 can be grounded to the housing 272 while the stop 284 is coupled to the movable portion, such as button 276. This can provide similar sensations to those generated by a grounded stop and floating actuator.

Similar to the embodiment of FIG. 4, different tactile modes can be provided; in some embodiments, one of multiple modes can be selected by the controller of the motor 280. For example, in a vibration mode, a series of discrete activation pulses can be sent to the motor 280 to drive the eccentric mass 282 against the stop 284 at regular periodic (or irregular, if desired) intervals, causing a vibration on the button.

Kinesthetic forces for a kinesthetic mode are not easily achieved except for the embodiments where an actuator engages one or more limiting stops 284 and can then displace the movable surface if current is controlled. For example, in a kinesthetic force mode, the mass 282 can be driven continuously against the stop 284 to cause a constant resistance force on the button 276 in its degree of freedom, or other type of force. For example, a spring force can be output by controlling the constant force on the button to be dependent on button position according to the relation F=kx, where x is the position of the button in the button's degree of freedom (a dedicated sensor can be provided to detect button position in the button degree of freedom).

In harmonic operation, the mass 282 can be driven in two directions, so that the mass can provide a vibration when it is between stops, and can be impacted with the stop 284 on either side of the stop to provide kinesthetic sensations or a different type of vibration sensation. For example, a variety of vibration sensations can be provided, such as moving the mass against either side of a stop alternately, or by driving the mass against the stop, then moving it away, etc. A kinesthetic mode can be controlled in either direction of the button in its degree of freedom by moving the mass against a corresponding side of the stop and causing a force on the button by continuously forcing the mass against the stop. In some embodiments, two stops can be provided to define a range of rotation for the mass 282. Such a configuration can cause a vibration on the button when the mass is operated harmonically between limit stops, and can provide a kinesthetic force control mode when the mass is forced against one of the stops. Actuators such as a spring biased solenoid can also be used since these actuators can be harmonic or can provide two basic forces from impact if driven to the end of their stroke.

Other embodiments described herein, such as those of FIGS. 3a and 3b, can also employ one or more stops in the range of motion of the eccentric mass to provide different haptic sensations. Another example of a tactile mouse includes an eccentric rotating mass motor coupled to mouse housing or the movable portion, and two stop members coupled to the other of the movable portion or mouse housing. The stop members defining a range of rotation of the mass. The rotating mass can shake the mouse housing and transmit inertial vibrations when operated harmonically between the limits defined by the stops. Then, if the motor is brought to bear against one of the stop members, the button surface may be displaced by controlling the motor current. This kind of motor working against a stop member is not like a bidirectional linear actuator because there is an inherent dead band, but spring effects can still be output in one direction of the button or the mass can intentionally impact the stop to generate "pops."

Some embodiments of mouse 270 may have inconsistent force output for reasons similar to other eccentric rotating mass embodiments: the initial conditions (position and velocity) of the eccentric mass may influence how the actuator operates in response to different drive input signals. As a result, the force effects may not feel repeatable or consistent and may be undesirable. For example, a command signal that commands a pulse effect when the cursor crosses over an icon may cause the force effect to be output too late, after the icon was crossed by the cursor, due to the time it takes for the mass to be accelerated against a stop. In some cases, rebound forces may counteract the next pulse and obscure subsequent effects. Such disadvantages may be solved in some embodiments by providing controlling methods and/or a sensor that detects mass rotational position that maintain the mass in a known position so that force sensations are repeatable and consistent. Gamepad motor control as described in application Ser. No. 09/669,029 may also be used.

Figure 6A:
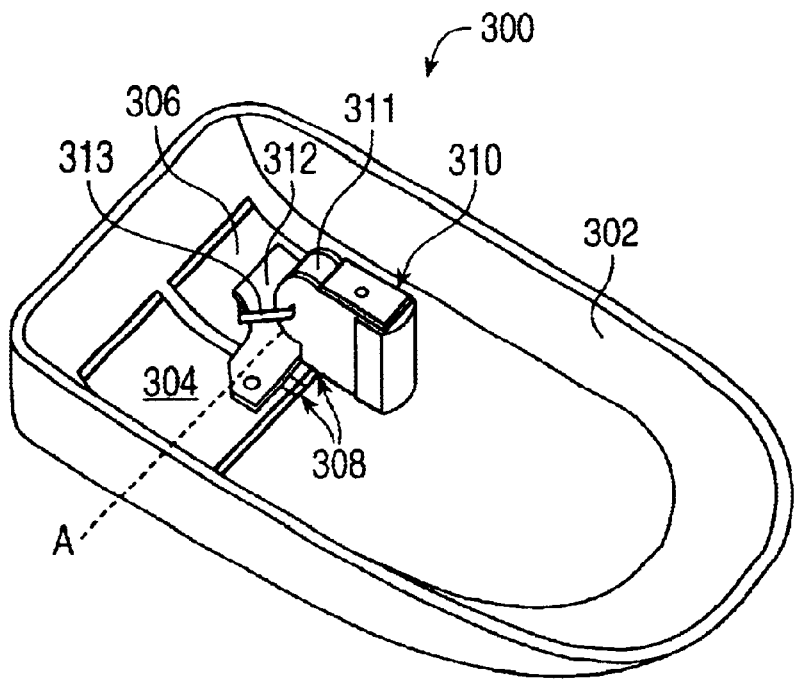
FIG. 6a is a perspective view of a haptic mouse interface device including a moving magnet actuator providing haptic sensations on a button of the device.
Figure 6B:
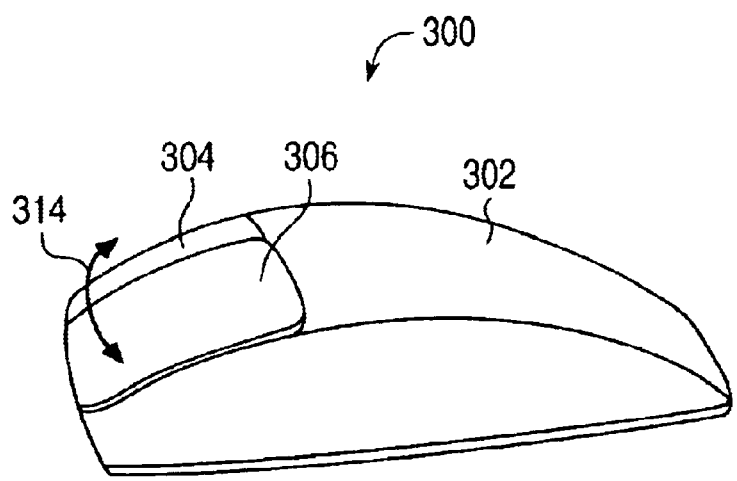

FIGS. 6a and 6b are perspective views of another embodiment 300 of a tactile mouse of the present invention. In FIG. 6a, an upper portion 302 of mouse 300 is shown, which is intended to mate with a bottom portion, e.g. a base similar to those shown with respect to FIGS. 3a and 3b, or other type of base. Two mouse buttons 304 and 306 are shown from the underside of the upper portion 302.

In embodiment 300, a moving-magnet actuator 310 is grounded to the housing 302. A moving magnetic portion 311 and bearing of the actuator 310 rotates about axis A and is coupled to the mouse button 306 by an extension member 313 which is guided by a support structure 312. Thus, the rotation of the moving magnet causes a force on the button 306 about that axis and directly in the degree of freedom of the button, allowing forces in either direction of that button's degree of freedom to be output when rotary forces are output by the actuator. This causes the button to pivot approximately about the axis of rotation. This motion of button 306 is shown in FIG. 6b by arrow 314. For example, half of a moving-magnet actuator as described in copending application Ser. No. 09/565,207, incorporated herein by reference in its entirety, can be used for actuator 310. Other types of moving-magnet actuators can also be used. In one embodiment, the actuator can produce several ounces of force at the button leading edge (the front tip of the button) where the stroke is, for example, about +/−0.125 in. The direct drive moving magnet implementation is capable of very high fidelity haptics. The buttons 304 and 306 can be coupled to the housing portion 302 at a hinge 308, or may be coupled only to the moving magnetic portion 311 or shaft of the actuator.

This embodiment can also be realized with a number of actuators and transmissions. Other embodiments and features of providing haptic feedback on a mouse button or other types of buttons are described in copending application Ser. Nos. 09/253,132 and 09/156,802, both incorporated herein by reference in their entirety. The forces are output approximately along the z-axis since the button moves approximately along that axis, and therefore the forces need not interfere with the movement of the mouse in the x-y plane. This makes it also well suited to providing the feel of a third dimension in relation to the two-dimensional plane of a display screen.

In some embodiments, the button can be biased to the top (upper limit) of its travel range; this allows a greater range of button movement in the down direction and can eliminate or reduce a loss of force that may occur for negative alternation when the button limit is reached. A physical spring (e.g. a leaf spring or other type of spring) can be used to bias the button to the top of its travel. This may cause, in some embodiments, the button to stick up above the top surface of the mouse housing and increased the finger force and stroke to close the button switch.

This embodiment can alternatively provide a button bias that is spring balanced and held in the center of its travel.

Spring biasing the button tends to provide more effective force sensations to the user than without the spring biasing.

Embodiments including haptic sensations on a mouse button may be more suitable for focused, high concentration tasks such as desktop applications. One advantage on other designs is its output of low frequency forces, allowing users to receive a good illusion of surface profile and texture as the cursor is moved across icons and menus. In gaming applications, pushing down on the button surface may overpower the forces. This is may not be desirable for particular games, e.g. shooting games. Additionally, the user may lose the feedback sensations when the index finger is not in place on the button. In some embodiments, the moving surface can be enlarged, or a surrounding portion of housing can be caused to move around the button (instead of the button being provided with forces, as described in copending application Ser. No. 09/156,802. This may also alleviate the button closure interference/long stroke issue since a standard button can be used.

Figure 7:
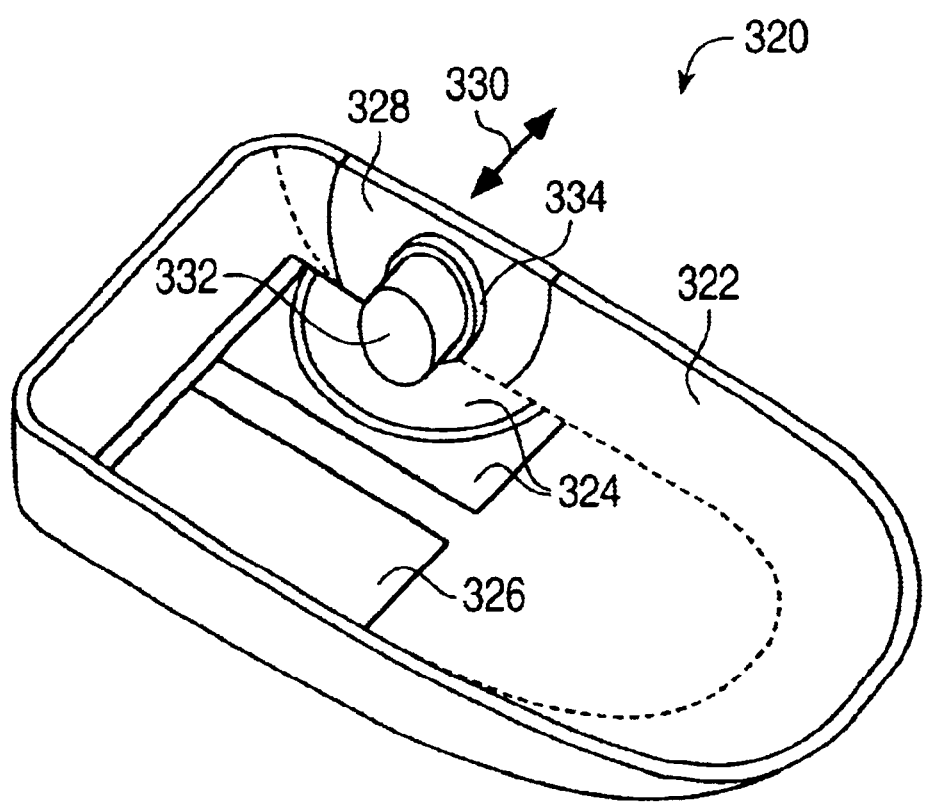
FIG. 7 is a perspective view of a haptic mouse interface device including a linear voice coil actuator providing haptic sensations on a movable housing portion.

FIG. 7 is a perspective view of another embodiment 320 of a tactile mouse of the present invention. The upper portion 322 of mouse 320 is shown, which is intended to mate with a bottom portion, e.g. a base similar to those shown with respect to FIGS. 3a and 3b, or other type of base. Two mouse buttons 324 and 326 are shown from the underside of the cover portion 322.

The cover portion 322 includes a movable surface portion 328 which can be moved relative to the cover portion 322 (or other remaining main portion of the housing). In the example shown, the movable portion 328 is positioned on the side of the mouse, where the user's thumb may contact the portion 328 during normal operation of the mouse. In this embodiment, the movable portion 328 may be moved in a direction approximately perpendicular to the side surface of the mouse (or other surface that immediately surrounds the movable portion) and approximately parallel to the x-axis of the mouse planar workspace, as shown by arrow 330. The moveable portion 328 can be coupled to the cover portion 322 by a spring or hinge that allows the outward motion of arrow 330. For example, foam can be used to act as a biasing spring to center the moving surface in its degree of freedom; other types of springs can also be used. This bias forces the user's thumb outward when the mouse is gripped normally. In the embodiment shown, the movable portion 328 does not have button functionality such as a switch activated by pressing the portion 328, but alternate embodiments can include such functionality if desired.

A linear voice coil 332, or other type of actuator providing linear motion, is coupled to the cover portion 322 (or other portion of the housing). For example, the voice coil 332 can be coupled to an extension 324 of the housing 322. The voice coil 332 includes a linearly-moving bobbin 334 that is directly coupled to the movable portion 328 so that the voice coil actuator 332 directly moves the portion 328. The movable portion 328 also magnetically centers itself in its degree of freedom due to the magnetic characteristics of the voice coil 332. One example of a linear voice coil suitable for use in mouse 320 is described in copending application Ser. No. 09/156,802.

Since the forces on the user are output only parallel to only one axis of mouse movement, such as the x-axis, forces meant for the y-axis can also be output on the x-axis-moving portion 328. The mapping from x-axis and y-axis to a single x-axis may present some perceptual challenges for the user. For example, position-based effects may make less sense to the user in this embodiment than in embodiments providing z-axis or both x- and y-axis forces, but still may be entertaining for the user. Clicks and pops are not directional and are well-suited to this embodiment. In some embodiments, a second moveable housing portion and dedicated voice coil actuator, similar to the thumb portion 328 and actuator 332, can be positioned to better map y-axis forces, e.g. such a second movable portion can be positioned on the front or back of the mouse housing and contact the user's fingers or palm.

Other embodiments can also be provided. For example, the entire cover portion, or a designated area of the cover portion, may be moved in the z-direction against the user's palm or fingers by a voice coil actuator or other type of actuator that directly moves the cover portion. The upper portion of the mouse housing can be flexibly coupled to the lower portion or base of the mouse so that the upper portion can be moved on the z-axis relative to the lower portion. Kinesthetic forces may not be perceived as easily by the user as tactile (e.g. vibration) forces, but this can be remedied by increasing the travel distance of the moving housing portion. Examples of such an embodiment are described in greater detail in U.S. Pat. No. 6,088,019, which is incorporated herein by reference in its entirety.

This embodiment offers some advantages in that the user is always experiencing force sensations while operating the mouse since the entire upper cover portion is moved. Some users may not palm the mouse in use, but rather grasp the side edges of the mouse. To accommodate this, the cover portion can be extended to the side areas or side grip surfaces or ridges can be made more pronounced to enhance feedback from the gap area in this grasp mode. It may not be necessary in some embodiments to palm the mouse to receive compelling tactile feedback due to feeling vibrations caused by the moving housing. If only a smaller portion of the upper housing portion is movable, then the user can avoid holding down and overpowering the moving portion. For example, displacing an island of plastic sealed by a bellows can provide just as effective force feedback as displacing the whole upper housing portion.

Furthermore, a gap formed by the split housing, between the upper and lower shells, creates a differentially displaced surface. Since the two portions of mouse housing are pinched to provide movement, the user may contact the gap when operating the mouse. When the two halves of the housing pinch together or apart, the user receives proportional information due to feeling the size of the gap changing. In other embodiments, a flexible material can be used to fill the gap or the differential information can be conveyed in other ways, such as putting tactile ridges on the upper and lower halves.

Another tactile mouse embodiment provides force feedback on a mouse wheel, such as a wheel 206 shown with reference to FIGS. 3a and 3b. A rotary actuator can provide rotational forces about the axis of rotation of the wheel. A surface providing good friction between the user's finger and the wheel is well suited to allow the user to feel the force sensations during control of the wheel. Many force feedback mouse wheel embodiments are described in U.S. Pat. No. 6,128,006, which is incorporated herein by reference in its entirety.

Merging any two or more features of the above embodiments into a single hybrid design can also be accomplished. Several of the functions and features can be combined to achieve a single design that, for example, has the mechanical simplicity of the moving upper housing design and the distinct focused or localized feedback of the haptic mouse button. Better hybrid designs incorporate multiple implementations with reduced numbers of actuators. For example, cost is much reduced if a single actuator can be used to output forces on the upper shell as well as a mouse button.

Component Embodiments

Any of the above embodiments for a haptic mouse can make use of a variety of types of actuators. The lowest cost actuators providing reasonably high performance are the most desirable for the consumer market. For example, a small DC rotary motor provides good harmonic actuation with decent bandwidth from DC to about 150 Hz. There are also many types of models available.

A solenoid can also be used. This actuator is not as desirable as the DC motor since it tends to deliver little haptic value for the material and power expense; solenoids are typically not good at providing constant force over a useful stroke. Solenoids, however, may work well in some embodiments to generate a digital "pop" or pulse effect. An off-the-shelf solenoid can be biased to generate a quasi-linear force vs. stroke profile, and the transmission may be simpler in those embodiments requiring linear motion since the solenoid already provides linear motion.

A shape memory alloy (SMA) wire with constant current drive circuit can also be used. This actuator is able to provide forces up to 100 Hz, especially "pops" in the range of 30 Hz. This can be a very forceful actuator; the operation of such a component is well known to those of skill in the art.

A speaker or voice coil motor (VCM) can also be used. Off-the-shelf speakers are optimized to move a column of air. The return path and bobbin parts that can fit in a mouse housing volume may not produce enough force or have enough stroke to be useful. However, a custom voice coil can be designed to provide a useful stroke and high output force over that stroke. This actuator can operate sufficiently well and can be manufactured in high volume by leveraging off of an existing industry, such as the audio voice coil industry.

For actuator couplings and transmissions, many components may be suitable. For example, a lead screw capable of being back driven can be used to couple a moving member to the actuator. The lead screw in some embodiments can incorporate a spring suspension to center the actuator. A molded flexure linkage driven with an eccentric cam moving in a slot can also be used. Alternatively, a one piece living hinge linkage (flexure) can be used to eliminate all pin joints and serve as the connection between the actuator and the housing. Examples of such flexures are described in copending application Ser. No. 09/585,741 and Ser. No. 60/236,558, filed Sep. 28, 2000 and entitled "Device and Assembly for Providing Linear Inertial Sensations," both incorporated herein by reference in their entirety.

User Interface Features

Figure 8:
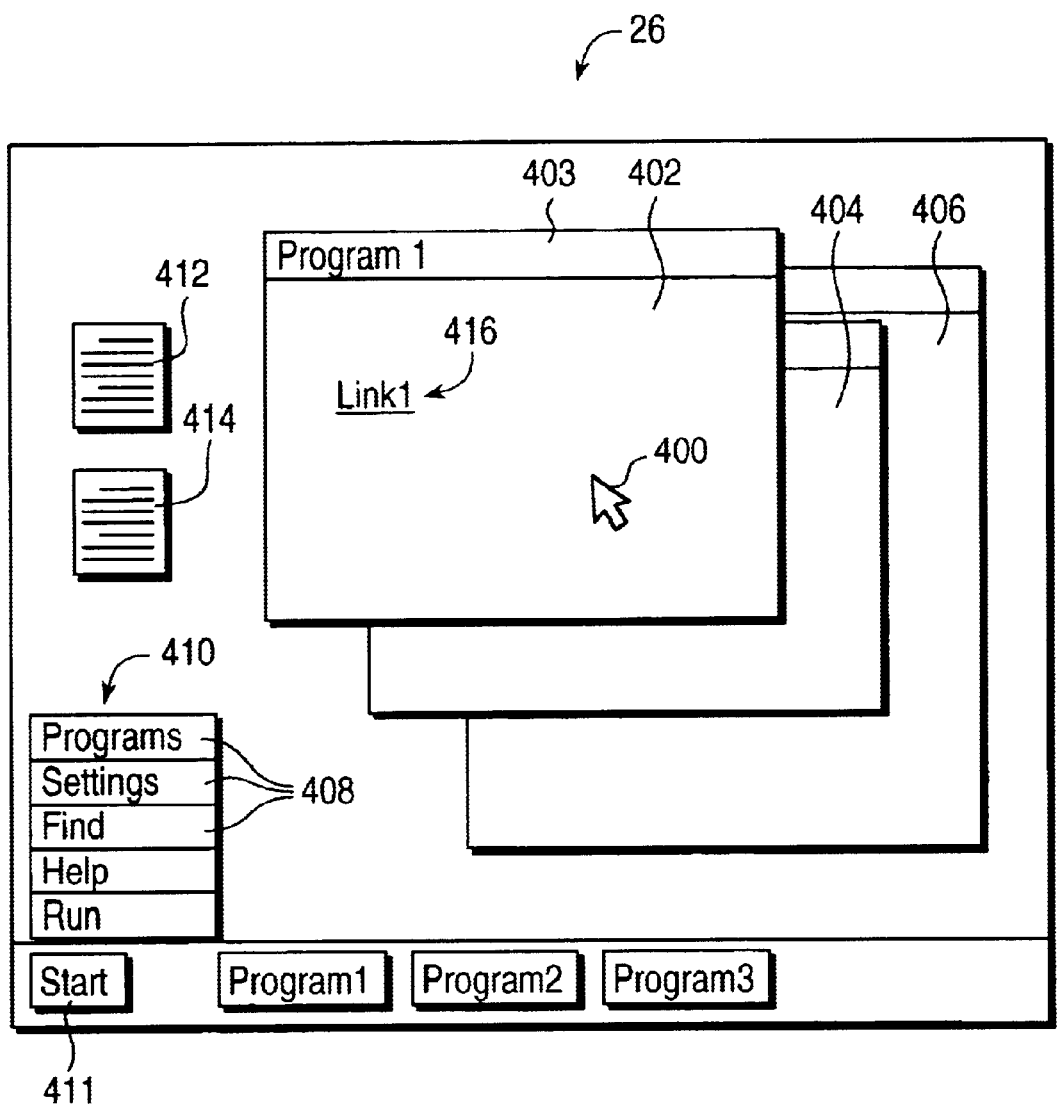
FIG. 8 is a diagrammatic illustration of a graphical user interface including objects associated with haptic sensations.

FIG. 8 is a diagram of display screen 26 of host computer 14 showing a graphical user interface, which is one type of computer-implemented graphical environment with which the user can interact using the device of the present invention. The haptic feedback mouse of the present invention can provide tactile sensations that make interaction with graphical objects more compelling and more intuitive. The user typically controls a cursor 400 to select and/or manipulate graphical objects and information in the graphical user interface. The cursor is moved according to a position control paradigm, where the position of the cursor corresponds to a position of the mouse in its planar (x-y) workspace. Windows 402, 404 and 406 display information from application programs running on the host computer 14. Menu elements 408 of a menu 410 can be selected by the user after a menu heading or button such as start button 411 is selected. Icons 412 and 414 and web link 416 are displayed features that can also be selected. Scroll bars, buttons, and other standard GUI elements may also be provided.

Tactile sensations associated with these graphical objects can be output using the actuator(s) of the device based on signals provided from the local microprocessor and/or host computer. A variety of haptic sensations that can be output on the housing and/or on a movable element of the device, and can be associated with GUI elements, including pulses, vibrations, textures, etc., are described in copending application Ser. Nos. 09/456,887 and 09/504,201, incorporated herein by reference in their entirety.

There are several desirable user interface features for the mouse embodiments described herein. A high quality, crisp feeling to the sensations, such as pulses or pops, on graphical objects such as scroll bars and menu items is appealing to users. Feeling a click or pop when entering or exiting an area on the GUI is helpful to locate the item haptically for the user. Tones, i.e. fixed magnitude variable frequency vibrations, can provide a full range of haptic sensations. High quality vibrations with varying magnitude and frequency, and good low frequency periodic forceful displacements provide a variety of high-quality feels to graphical objects. Window boundaries can also be associated with a spring under the finger button, in appropriate embodiments.

Preferably, system events and sounds are mapped to haptic feedback sensations output by the mouse. Textures can also be implemented, e.g. x- and y-axis forces mapped to z-axis forces. Textures can, for example, distinguish window fields and areas or other areas of the graphical environment. Haptic feedback can also be output to the user to confirm the pressing of a key or a button by the user. When an icon or other object is dragged by the cursor, a sensation of icon weight can be implemented as a vibration "tone," where the tone frequency indicates weight of the selected object; for example, a low frequency vibration signifies a heavy or large graphical object or a large data size (e.g. in bytes) of a selected or dragged object, while a high frequency vibration indicates a small or lightweight object. To avoid disconcerting jarring effects as the cursor crosses icons, the force magnitude can be reduced (or otherwise adjusted) as a function of cursor speed in the GUI.

Mouse Button Sensations

Additional user interface features can be provided for particular embodiments. For example, for the embodiment 300 or 270 providing haptic feedback on a button, several user interface haptic feedback sensations can be provided. Some compelling haptic sensations do not require a position sensor to determine a position of the button in its degree of freedom.

For example, "soft spots" or variable compliance surfaces can be provided on objects or areas in the GUI. When the user moves the cursor over a button, icon, menu item, or other selectable target (surface, object, or area), the pressing force required by the user to complete a button actuation is decreased noticeably by reducing resistance force in that direction of the button and/or providing an assistive force in that direction of button motion. This may give the user the perception of an active detent without using position-based forces to guide the mouse to the target. A vector force that doubles (or otherwise increases) the stiffness of the button can be used to require a greater pressing force to actuate the button when the cursor is not positioned over a selectable target or particular types or instances of selectable targets.

If a sensor, such as a low-resolution encoder or potentiometer, is added to determine button position in its degree of freedom, additional sensations can be provided. For example, "piercing layers" can provide the user with the sensation of a third dimension into the plane of the screen. The graphical environment or application may have several windows or other objects which are "layered" based on when the window was opened and which windows have been made active "over" other windows. For example, window 404 is displayed on top of window 406, and window 402 is displayed on top of the windows 404 and 406. Typically, only one window is "active" at one time, e.g. accepts input from a keyboard or other input device; for example, the active window can have a differently-colored title bar 403 or other indicator. It can be convenient to toggle rapidly through such windows (or other types of layers). The haptic feedback mouse button of the present invention can provide this functionality by outputting a progressive spring force with detents overlaid on the spring. When in a layer selection mode, the moving of the button downward causes lower layers to become active, where distinct positions of the button can each be associated with a particular layer. A detent force or pulse output on the button can tactilely indicates when another layer is to be "punctured" by the cursor and become active.

For example, positioning the cursor over a blank spot in an active window 402 can put the mouse and cursor in a layer selection context or mode. The user then presses the mouse button until the cursor "pierces" through the current layer which causes a distinct puncture force effect such as a detent or jolt, and window 404 (or other object) at a new layer becomes active. Continuing to depress the button to a lower position will pierce yet another layer so that window 406 becomes active, and so on, where each layer provides a puncture effect, such as a small resistance force (so that the user does not accidentally move the button into the next layer). When the user arrives at the desired window or layer, the button is released, which informs firmware or software that a particular number of layers have been punctured and which window at a lower layer should be active and displayed on top. Puncturing successive layers can cause the successive windows to appear one after another as the active window. This feature can also be useful for application programs having several windows, like SolidWorks™. Such a feature would alleviate the use of keys or menus to toggle between, for example, part and assembly windows, which can be a distraction for the user. It can be much faster to pull the cursor to a blank area of the screen where puncturing and depressing functions let the user rapidly select the next window without doing any targeting at all. This feature is also applicable to drawing programs, in which the user often organizes a drawing into different layers to allow the user to select, edit, and/or view only the parts of the drawing on a single layer at one time. A user can access the different drawing layers using the method described above.

In some embodiments, if the user releases the button and then depresses the button again, the "puncture holes" the user previously made allow the button to be depressed more easily through those previously-punctured layers and are signaled by significantly diminished spring or detent forces or distinctly different force profiles. The user knows which layer is enabled by how many decreased-force punctures the user feels before reaching an unpunctured layer, which has a noticeably higher force (a stiff rubber diaphragm is a good analogy). In some embodiments, double clicking on the unpunctured layer causes the selected window to be displayed as the active layer. This example requires at least a crude position sensor, perhaps an encoder with several (e.g. about 64) counts over the stroke of the actuator. The value of such a feature would depend on how well integrated the application is. In one embodiment, an application program or GUI can determine how many windows are currently open and can spatially subdivide the button travel distance accordingly to allow constant spacing between puncture points.

Another haptic sensation and user interface feature are layers with inertial or a "turnstile." In such a layer implementation, a window or other graphical selected object. can be considered to be "attached" to the mouse button, where moving the mouse button down moves the window "into" the screen to a different, lower layer. For example, when moving the cursor to a blank area of an active window 402, the user can depress the button and feel the inertia of the window 402 and push that window into the background, behind other windows 404 and 406, so that the window 404 at the next highest level becomes active. As the next window 404 becomes active, the user feels a detent in the button's Z-axis signifying that the next window is now active. An analogy is a "turnstile" having multiple sections, where as each section becomes active, the user receives haptic feedback. This could also be used for spin boxes: Animations can show a window that has been "pushed" into the background as spinning into the screen and away. The inertial sensation can be a resistive force on the button and can be related to window size or other characteristics of the window. Again, a low-resolution position sensor is desirable to sense the position of the button in its degree of freedom.

Another button user interface feature of the present invention is a rate control button. The "layers" described above can be extended further by allowing that the same actuator and displaced surface and sensor assembly can be used to implement rate control at a surface function. For example, the cursor can be moved over a control such as a volume button. The user then moves the mouse button down to a first detent or pulse. The detent signifies that the volume control is selected and that a rate control mode has been entered. The user then moves the mouse button up or down, and this controls the actual volume level. For example, the volume can be adjusted a rate proportional to the distance of the button from its origin (centered) position. The rate control mode can be exited by, for example, allowing the button to move to its highest level, by pressing another button, etc. Preferably, a spring force resists the motion of the mouse button in rate control mode to allow greater control by the user.

Rate control with an active button can also be useful for scrolling documents or other objects. For example, pushing the button a greater distance down (against a spring force) can increase the speed of scrolling, and allowing the button to move upward can decrease the scrolling speed, similar to the scrolling in the Wingman force feedback mouse from Logitech Corp. Since most scrolling is vertically oriented in the GUI, this is well correlated to a vertical button depression and is a natural feature.

Multiple switch actions can also be implemented using a haptic button. While conventional mouse buttons are fixed-movement mechanical buttons, the haptic feedback button with a position sensor of the present invention can become a huge variety of buttons with different force versus depression/actuation profiles implemented in software and using the actuator. Profiles such as a long stroke with very linear force or a short stroke with over-center snap action (toggle action) are possible with the same hardware. Other possibilities include buttons that vibrate when the user begins to depress them and then warn the user more aggressively when the user has slightly moved the button as if he or she is about to click the button.

Other button effects can be specially tailored for the embodiment 270 of FIG. 5, which uses a stop and a rotating eccentric mass to provide forces on the button. For example, rudimentary layer effects can be generated which do not involve rapid force reversals of the type felt piercing through a diaphragm, for instance. If the button is connected to a position sensor and the eccentric mass can be moved to bear against a stop anywhere in the movement range of the button, then kinesthetic forces (such as springs) can be output in one direction anywhere in that button's range of motion. Clicks (pulses) and pops can be generated by the inertial coupling of simple mass rotation, which can transmit a harmonic burst into the mouse housing for subtle pops. Alternatively, the mass can be controlled to rapidly engage a stop to generate a harsh knock or popping effect.

Superposition of haptic effects can also be achieved with the embodiment 270. While the actuator is forcing the eccentric mass against a stop to provide a kinesthetic force on a movable surface (based on a DC drive signal), a high frequency harmonic signal may be applied to the actuator to output a vibration on the movable surface. This would allow the layers implementation above to include layers having different "tones" (vibrations of different frequencies) when punctured; also, the tone can change frequency as the layer is moved, deformed, or manipulated. Preferably, the DC signal that forces the mass against the stop is always at least slightly greater in magnitude than the maximum negative alternation of the superimposed harmonic signal; this prevents the mass from moving off the stop (negative direction) and moving back into it and thus avoids a "chatter" of the mass.

Figure 9:
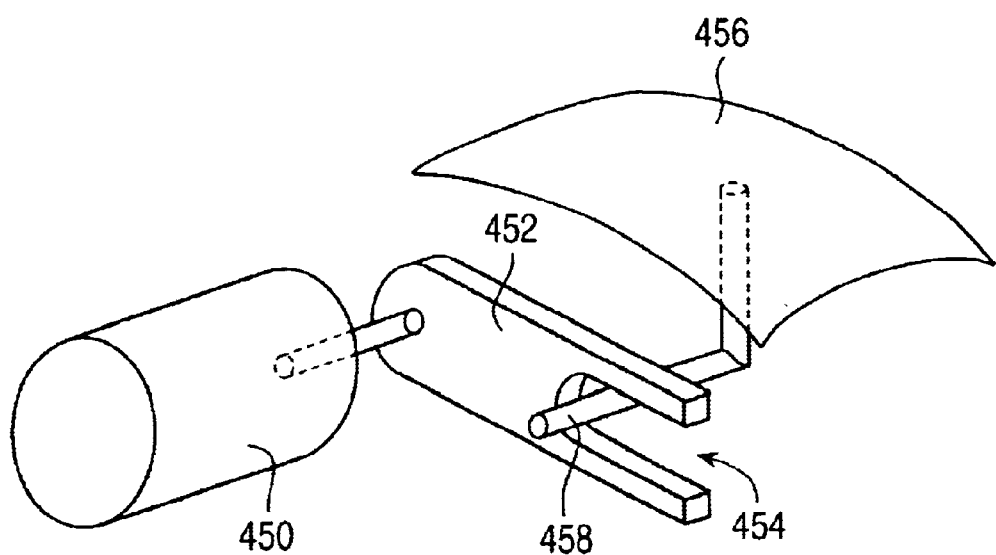
FIG. 9 is a perspective view of an actuator and transmission for providing forces on a button or other movable member.

Another control scheme can be provided for a rotating mass with slot and pin action built into the mouse button to manage clicks and pops with more complex effects occurring simultaneously. Such a configuration is shown in FIG. 9, where the actuator 450 is coupled to a slot member 452 (mass) having a slot 454. A movable member 456, such as a button or portion of the housing, is coupled to a pin 458 that extends into the slot 454. The slot 454 is made wider than the pin, so that the actuator 450 can drive the slot member 452 harmonically without contacting the pin 458 and provide inertial sensations to the housing. In addition, the slot member 452 can engage the pin 458 to move the member 456 and provide kinesthetic forces on the member 456. The control scheme for superposition of forces would, first, slowly rotate the member 452 against gravity until the pin 458 engages the side of slot 454. This can be a default position so that the actuator is instantly able to respond to force commands without discontinuities. A high current is then commanded to produce a vertical force on the button 456. The current is maintained to maintain the slot member in the upward direction, and a harmonic signal is superimposed on the DC signal to oscillate the slot member and provide a vibration on the button in addition to the kinesthetic force; the DC signal prevents chatter of the slot member against the pin. The current can be turned off to allow gravity to return the slot member to its neutral position.

While this invention has been described in terms of several preferred embodiments, it is contemplated that alterations, permutations and equivalents thereof will become apparent to those skilled in the art upon a reading of the specification and study of the drawings. For example, the various embodiments disclosed herein can provide haptic sensations in a wide variety of types of interface devices, handheld or otherwise. Furthermore, certain terminology has been used for the purposes of descriptive clarity, and not to limit the present invention. It is therefore intended that the following appended claims include alterations, permutations, and equivalents as fall within the true spirit and scope of the present invention.

What is claimed is:

1. A haptic feedback mouse device for providing haptic sensations to a user, said haptic feedback mouse device comprising:
   a housing physically contacted by said user and moveable in an x-y plane;
   a sensor coupled to said housing and operative to output a sensor signal indicative of said movement in said x-y plane;
   an actuator coupled to said housing; and
   an eccentric mass coupled to said actuator, wherein said eccentric mass can be rotated by said actuator, and wherein said rotation of said eccentric mass causes inertial haptic sensations to be output on said housing and felt by said user.

2. A haptic feedback mouse device as recited in claim 1 wherein said actuator rotates said eccentric mass approximately in an x-z plane, a y-z plane, or a combination thereof.

3. A haptic feedback mouse device as recited in claim 1 wherein said actuator rotates said eccentric mass approximately in an x-y plane.

4. A haptic feedback mouse device as recited in claim 1 wherein said inertial force is a pulse correlated with the interaction of a user-controlled cursor with a graphical object displayed in a graphical user interface.

5. A haptic feedback mouse device as recited in claim 4 wherein said pulse is output with a magnitude dependent on a characteristic of said graphical object with which said cursor interacts.

6. A haptic feedback mouse device as recited in claim 1 wherein said force is included in a force sensation, said force sensation being one of a pulse, vibration, and texture force.

7. A haptic feedback mouse device as recited in claim 1 further comprising a microprocessor, separate from said host computer, coupled to said sensor and to said actuator, said microprocessor operative to receive host commands from said host computer and output force signals to said actuator for controlling said inertial force, and operative to receive said sensor signal from said sensor, process said sensor signal, and report locative data to said host computer derived from said sensor signal and indicative of said movement of said mouse.

8. A haptic feedback mouse device as recited in claim 1 wherein said sensor includes a ball that frictionally contacts a surface on which said housing is moved by said user.

9. A haptic feedback mouse device as recited in claim 1 wherein said sensor includes an optical sensor that detects motion of a surface on which said housing is moved relative to said housing of said mouse.

10. A haptic feedback mouse device as recited in claim 1 wherein said actuator is controlled harmonically with a drive signal input to rotate said eccentric mass in two directions and produce an inertial vibration.

11. A haptic feedback device for providing haptic sensations to a user, said haptic feedback device comprising:
   a housing physically contacted by said user, wherein said housing includes a movable portion and a base portion, wherein said movable portion is movable with respect to said base portion, and wherein said moveable portion includes a magnet;

an actuator coupled to said housing; and an eccentric mass coupled to said actuator, wherein said eccentric mass can be rotated by said actuator, and wherein a magnetic interaction between said eccentric mass and said magnet causes an inertial haptic sensation to be output on said movable portion of said housing and felt by said user when said user contacts said movable portion, said inertial haptic sensation influenced by the position of said eccentric mass.

12. A haptic feedback device as recited in claim 11 wherein said movable portion is a button on said haptic feedback device, and said base portion is a remaining portion of said housing, said button operative to close a switch when pressed by said user, said switch outputting a button signal.

13. A haptic feedback device as recited in claim 11 wherein said haptic feedback device is a mouse and wherein said housing is movable in an x-y plane by said user.

14. A haptic feedback device as recited in claim 11 wherein said eccentric mass is made of a material that interacts magnetically with said magnet.

15. A haptic feedback device as recited in claim 14 wherein said eccentric mass is made of iron or steel.

16. A haptic feedback device as recited in claim 15 wherein said eccentric mass is made of a permanently-magnetic material.

17. A haptic feedback device as recited in claim 11 wherein said eccentric mass is rotated in a x-z plane or a y-z plane.

18. A haptic feedback device as recited in claim 11 wherein said haptic feedback device includes an inertial mode, wherein said eccentric mass is rotated to provide inertial haptic sensations to said housing caused by said rotation, and wherein said haptic feedback device includes a kinesthetic mode, wherein said eccentric mass is rotated to a particular position to provide a force on said movable portion based on said position of said eccentric mass.

19. A haptic feedback device as recited in claim 18 wherein said eccentric mass is controlled to provide a spring force on said movable portion.

20. A haptic feedback device as recited in claim 18 wherein said eccentric mass is controlled to provide a resistance force on said movable portion.

21. A haptic feedback device as recited in claim 11 wherein said haptic feedback device is a gamepad.

22. A haptic feedback device for providing haptic sensations to a user, said haptic feedback device comprising:

a housing physically contacted by said user, wherein said housing includes a movable portion and a base portion, wherein said movable portion is movable with respect to said base portion;

an actuator coupled to said housing or to said movable portion;

a mass coupled to said actuator, wherein said mass can be rotated by said actuator; and a stop member coupled to said movable portion if said actuator is coupled to said housing, or to said housing if said actuator is coupled to said movable portion, wherein said stop member is positioned at least partially in a path of rotation of said mass, and wherein said mass is moved against said stop to produce haptic sensations on said movable portion that are felt by said user contacting said movable portion.

23. A haptic feedback device as recited in claim 22 wherein said mass is an eccentric mass.

24. A haptic feedback device as recited in claim 22 wherein said haptic feedback device is a mouse.

25. A haptic feedback device as recited in claim 22 further comprising a sensor coupled to said housing and operative to output a sensor signal indicative of movement of said housing in an x-y plane.

26. A haptic feedback device as recited in claim 22 wherein said movable portion is a button of said device, said button operative to close a switch when pressed by said user, said switch outputting a button signal.

27. A haptic feedback device as recited in claim 24 wherein said actuator is coupled to said movable portion and wherein said stop member is coupled to said housing.

28. A haptic feedback device as recited in claim 22 wherein said stop member is a first stop member, and further comprising a second stop member coupled to said same movable portion or said housing to which said first stop member is coupled, wherein said first and second stop members define a rotatable range for said mass.

29. A haptic feedback device as recited in claim 22 wherein said actuator is controlled harmonically with a drive signal input to rotate said eccentric mass in two directions and produce a vibration.

30. A haptic feedback device as recited in claim 22 wherein said haptic feedback device includes an inertial mode, wherein said eccentric mass is rotated harmonically away from said stop to provide inertial haptic sensations to said housing caused by said rotation.

31. A haptic feedback device as recited in claim 22 wherein said haptic feedback device includes a kinesthetic mode, wherein said eccentric mass is rotated against said stop member to output a force on said movable portion.

32. A haptic feedback device as recited in claim 22 wherein a vibration is induced in said housing by impacting said mass against said stop periodically.

33. A haptic feedback mouse device for providing haptic sensations to a user, said haptic feedback mouse device comprising:

a device housing physically contacted by said user and movable in an x-y plane, wherein said device housing includes a movable portion and a main housing portion, wherein said movable portion is movable with respect to said main housing portion;

a moving magnet actuator having an actuator housing coupled to said device housing and a moving magnet coupled to said movable portion; and a sensor coupled to said housing and operative to output a sensor signal indicative of said movement in said x-y plane.

34. A haptic feedback mouse device as recited in claim 33 wherein said movable portion includes a button of said mouse device, said button operative to close a switch when pressed by said user, said switch outputting a button signal.

35. A haptic feedback mouse device as recited in claim 34 further comprising a physical spring that biases said button near to a center of a degree of freedom of said button.

36. A haptic feedback mouse device as recited in claim 34 wherein said haptic feedback mouse is in communication with a host computer, said host computer displaying a graphical environments including a hierarchy of graphical objects, wherein said user can select one of said graphical objects in said hierarchy by moving said movable portion, wherein a haptic sensation indicates to said user a selection of each of said graphical objects in said hierarchy.

37. A haptic feedback mouse device as recited in claim 36 wherein said graphical objects in said hierarchy are windows, each of said windows provided above or below another window in said hierarchy.

38. A haptic feedback mouse device as recited in claim 37 wherein motion of said movable portion causes a selected graphical object to be moved within said hierarchy.

39. A haptic feedback mouse device for providing haptic sensations to a user, said haptic feedback mouse device comprising:

a device housing physically contacted by said user and movable in an x-y plane, wherein said device housing includes a movable portion and a main portion, wherein at least part of said movable portion is positioned on a side of said housing and is movable with respect to said main portion;

a linear actuator having an actuator housing coupled to said device housing and an actuated portion coupled to said movable portion, wherein said linear actuator moves said movable portion of said device housing linearly away from said main portion of said housing when controlled with a control signal, thereby providing a haptic sensation to a user contacting said movable portion; and a sensor coupled to said housing and operative to output a sensor signal indicative of said movement in said x-y plane.

40. A haptic feedback mouse device as recited in claim 39 wherein said movable portion engages a thumb of said user in normal operation of said mouse device.

41. A haptic feedback mouse device as recited in claim 39 wherein said movable portion is a first movable portion, and wherein said device housing includes a second movable portion, wherein at least part of said second movable portion is movable with respect to said main portion, and wherein said second movable portion is moved by a second linear actuator to provide a haptic sensation to said user contacting said second movable portion.

42. A haptic feedback mouse device as recited in claim 41 wherein said first movable portion outputs haptic sensations applicable for an x-axis of said mouse device, and said second movable portion outputs haptic sensations applicable for a y-axis of said mouse device.

43. A haptic feedback mouse device as recited in claim 39 wherein said haptic sensation is a pulse correlated with the interaction of a user-controlled cursor with a graphical object displayed in a graphical user interface.

44. A haptic feedback mouse device as recited in claim 39 wherein said haptic sensation is one of a pulse, vibration, and texture force.

45. A haptic feedback mouse device as recited in claim 39 further comprising a microprocessor coupled to said sensor and to said actuator, said microprocessor operative to receive host commands from a host computer in communication with said mouse device, operative to output force signals to said actuator for controlling said haptic sensation, and operative to receive said sensor signal from said sensor, process said sensor signal, and report locative data to said host computer derived from said sensor signal and indicative of said movement of said device housing.

* * * * *